(12) United States Patent
Owens et al.

(10) Patent No.: US 6,315,572 B1
(45) Date of Patent: Nov. 13, 2001

(54) METHOD AND SYSTEM FOR COMPUTERIZED AUTHORING, LEARNING, AND EVALUATION

(75) Inventors: Terry S. Owens; Donald J. West, both of Orem; Douglas C. Draper; Duane R. Winden, both of Provo, all of UT (US); William M. Bancroft, 4345 N. Windsor Dr., Provo, UT (US) 84604

(73) Assignee: William M. Bancroft, Provo, UT (US)

( * ) Notice: Subject to any disclaimer, the term of this patent is extended or adjusted under 35 U.S.C. 154(b) by 0 days.

(21) Appl. No.: 09/286,527

(22) Filed: Apr. 5, 1999

Related U.S. Application Data

(63) Continuation-in-part of application No. 08/781,102, filed on Jan. 9, 1997, now Pat. No. 5,890,911, and a continuation of application No. 08/548,751, filed on Oct. 26, 1995, now abandoned, and a division of application No. 08/408,734, filed on Mar. 22, 1995, now abandoned.

(51) Int. Cl.[7] .............................. G09B 7/00; G09B 19/00
(52) U.S. Cl. ........................ 434/322; 434/118; 434/323; 434/362
(58) Field of Search .................................... 434/118, 322, 434/323, 350, 362, 365

(56) References Cited

U.S. PATENT DOCUMENTS

| | | | | |
|---|---|---|---|---|
| 3,606,688 | * | 9/1971 | Zawels et al. ...................... | 434/323 |
| 4,213,251 | * | 7/1980 | Foundos ............................... | 434/327 |
| 4,627,818 | * | 12/1986 | Von Fellenberg .................... | 434/236 |
| 4,820,167 | * | 4/1989 | Nobles et al. ....................... | 434/336 |
| 4,895,518 | * | 1/1990 | Arnold et al. ....................... | 434/118 |
| 4,958,284 | * | 9/1990 | Bishop et al. ....................... | 364/419 |
| 5,002,491 | * | 3/1991 | Abrahamson et al. ............... | 434/322 |
| 5,035,625 | * | 7/1991 | Munson et al. ...................... | 434/327 |
| 5,059,127 | * | 10/1991 | Lewis et al. ......................... | 434/353 |
| 5,173,051 | * | 12/1992 | May et al. ........................... | 434/118 |
| 5,180,309 | * | 1/1993 | Egnor .................................. | 434/327 |
| 5,195,033 | * | 3/1993 | Samph et al. ....................... | 434/323 |
| 5,259,766 | * | 11/1993 | Sack et al. .......................... | 434/362 |
| 5,261,823 | * | 11/1993 | Kurokawa ............................ | 434/323 |
| 5,308,244 | * | 5/1994 | Hirose ................................. | 434/169 |
| 5,350,303 | * | 9/1994 | Fox et al. ............................. | 434/118 |
| 5,385,475 | * | 1/1995 | Sudman et al. ..................... | 434/307 |
| 5,421,730 | * | 6/1995 | Laskar, III et al. .................. | 434/118 |
| 5,441,415 | * | 8/1995 | Lee et al. ............................ | 434/350 |
| 5,480,306 | * | 1/1996 | Liu ...................................... | 434/118 |
| 5,774,525 | * | 6/1998 | Kanevsky et al. ................... | 379/88 |

\* cited by examiner

*Primary Examiner*—John Edmund Rovnak
(74) *Attorney, Agent, or Firm*—Kirton & McConkie; Michael F. Krieger

(57) ABSTRACT

A method and system for computerizing authoring, learning, and evaluation is provided. The computerized system comprises a central processing unit and related memory and storage capacity to operate an authoring, learning, and evaluation system stored in a computer program. The authoring, learning, and evaluation system comprises an authoring portion and a presentation portion. Through the use of intuitive interface elements, the authoring portion allows an author to quickly and easily construct a lesson from a pool of relevant data. Data can be organized into objects or concepts that are related to one another in a reasoned fashion so that coherent testing of the data, as presented to a user, may be achieved.

38 Claims, 13 Drawing Sheets

METHOD AND SYSTEM FOR COMPUTERIZED AUTHORING, LEARNING, AND EVALUATION

RELATED APPLICATION

The present patent application is a continuation application in part from commonly assigned U.S. Pat. No. 08/781,102, filed Jan. 9, 1997, now U.S. Pat. No. 5,890,911 issued Apr. 6, 1999 and incorporated by reference for all purposes, which is a continuation of Ser. No. 08/548,751, filed Oct. 26, 1995, now abandoned, which is a divisional of Ser. No. 08/408,734, filed Mar. 22, 1995 now abandoned.

BACKGROUND OF THE INVENTION

1. The Field of the Invention

This invention relates to methods and systems for computerized authoring, learning, and evaluation. More specifically, this invention relates to methods and systems for allowing an author to organize and present information to a student and to generate test questions contextually relevant to the learned material.

2. The Relevant Technology

Testing has typically held a central role in the learning process. In educational settings, an individual is first presented with information that is to be learned and, in order to measure the amount of information learned, a test is given. Testing has evolved into a specialized field. Many theories have been developed in order to both develop tests designed to measure a particular level of achievement or mastery and to interpret the results of such a test. Thus, standardized tests have been developed to measure such things as Intelligence Quotient, personality traits, fitness to practice a profession such as law, medicine, contracting or the like, aptitude for success in a specific environment, and mastery of individual skills.

Historically, tests have been administrated on either an individual basis, such as oral or written examination, or on a group basis, such as a test administered in an educational setting where students record their answers on paper which are to be evaluated at a later time. One of the advantages of a written test is the efficiency in testing a large number of individuals. Unfortunately, a written test administered in such a manner lacks the ability to provide immediate feedback on an individual basis. Thus, it is generally recognized that testing in a traditional educational setting represents a tradeoff between efficiency and the ability to provide individual feedback.

It is generally unreasonable to expect that an individual test would be developed for each individual. Thus, in order to preserve the ability of the test to measure an individual's aptitude, care must be taken not to disclose the answers to a test. Likewise, where the test is designed to measure individual performance, care must be taken to insure that each individual takes the test based on his or her own knowledge.

In order to prevent cheating and to minimize the probability of an individual test score being influenced by others, multiple tests may be developed and administered simultaneously so that each individual is, in effect, taking a different test. Problems associated with this methodology, however, generally prevent its implementation. The effort and expense of developing and grading multiple tests generally limits this methodology to very specialized applications.

Many educators believe that measurement of performance and feedback is critical in the learning process. While written tests may be an efficient way to measure performance, they are largely inefficient in providing adequate feedback for learning. Generally there is a large lag time between the time when the test is taken and when the results of the test are returned. During this lag time, new information is usually presented. Thus, when the tests are returned, the focus of both the material and the individual has shifted. Thus, relatively few students will use such a test to evaluate their weaknesses and return to prior material in order to strengthen those weaknesses.

In order to overcome this limitation, some courses of study are structured with many smaller tests interspersed throughout the material. While this generally improves the potential for feedback, still such a method is relatively inefficient. Further, it dramatically increases the workload of an instructor or teacher.

In order to enhance the learning environment, many educators realize that the optimal form of instruction would be a personalized instructor for each student or individual. This, however, is generally impractical in most learning environments. In order to provide a better learning environment that more closely approaches the ideal environment of one instructor for every student, some educators are turning to computers. Through the use of computers, learning programs may be developed which provide instruction and feedback virtually simultaneously. For example, a general course of instruction may be presented to an individual after which the computer can query the individual regarding the principles just learned. The computer can then tally the score and provide the score to the individual. This allows the individual to return to information not learned and again review the material. Another advantage of computers is that they allow the pace of instruction to be varied according to the ability of the individual to learn. Furthermore, computers can be used to enhance personal learning outside the traditional educational environment. Computers thus hold great potential for enhancing the learning environment.

Current utilization of computers as part of the learning environment take their modes and methods of operation from current teaching techniques. Most computer programs designed to aid in the learning process first present a section of information and then test the individual based on the information presented. The structures of these programs are generally organized in a pre-set or pre-defined manner. Thus, like text books generally utilized in educational settings, the program presents a chapter of information and then quizzes the user on the information contained in that chapter. The next chapter is then presented, if any, along with the associated test. Programs which are organized to present information in this manner, are generally very inflexible and do not allow the user to determine in which order the information will be presented. Although this has the advantage of presenting information in an order which has been shown by long experience to be the "best" for learning the information, it forces the user to review information that may already be known.

In order to provide more flexibility, some programs allow the user to select which chapters will be presented. Thus, the user is allowed to determine the basic ordering of the chapters of information. While this allows the user some degree of flexibility in the process, it still deals with information in relatively large units. Thus, the presentation of information still remains relatively fixed and ridged. Concepts from different units or chapters must be tied together in the mind of the user. Similarly, because the tests are presented after each unit, no overview test is provided. It would thus be an advancement in the art to provide a method to allow the user more control not only over the order and sequence of presentation but also the focus and scope of the tests administered.

In an attempt to remedy this shortcoming, some programs are also provided with a global or overview test. These tests allow a user to be tested on the entire subject matter Because of the general nature of these tests, a user must generally review all material in the program before these tests can be utilized. Thus, there still remains an inability to test only on the information that has been presented to a user.

Another potential problem with these types of programs is the inability of the program to vary its behavior when presenting test questions. Once an individual has worked through a lesson or chapter, the set of questions at the end are generally fixed. Thus, an individual who must review the material several times in order to learn it, may learn the sequence of test questions. The test then becomes less a measure of the actual knowledge possessed by the user and more a measure of the ability of the user to memorize the sequence and order of test questions. In order to prevent this occurrence, many programs have built into them a random component. This component presents the test questions in a random order. Memorization of the test questions by an individual is thus more difficult. While this has the advantage of providing a little different look each time the program is run, it still does not totally solve the problem.

In an attempt to strengthen this part of the program, certain manufactures have created a larger set of questions. The test would then ask a subset of these questions in a random order. In this way, not only is the order of test questions randomized, but also the selection of the test questions themselves. Thus, a user reviewing the same material on two different occasions, may not be presented with the same questions. While this provides an even greater degree of randomness so that the tests are different each time they are taken, care must be utilized to insure that each question is asked only once. Furthermore, the effectiveness of this method depends on the number of questions available for use relative to the number of questions which are asked during each test.

This problem raises one of the limitations of these types of programs. The effectiveness of the test and evaluation section of the program is generally dependent on the number of questions that can be asked of an individual. During development of these programs, it is often very difficult and time consuming for an individual to generate a pool of questions for use during testing. Each question must be authored and then entered and programmed into the computer so that it can be asked at the appropriate time. The larger the number of test questions, the harder the program is to develop. Thus, many of these type of programs utilize relatively simple testing methodologies in order to minimize the total number of test questions that must be developed.

Speed and complexity of development are always paramount considerations when crafting these types of learning programs. Development of these types of programs generally begins by obtaining information. After information is obtained, the information must be sorted into logical categories for presentation. This process can be illustrated by a glance through a typical classroom textbook. In the textbook, information is organized or grouped by chapters to provide a logical and coherent flow for the individual utilizing the textbook. In much the same way, information is organized and structured into chapters or units or lessons to facilitate this logical and orderly flow. For each chapter or lesson, if testing is desired, then a pool of test questions must be drafted and developed. The answers to these questions must also be developed. The programmer or developer then organizes the information so that it can be presented to the user. The test questions and answers are also organized so they can be presented to the user.

The time it takes to develop a learning program can be very significant. In order to minimize the development time, there is a tendency to minimize either the amount of information presented or the number of test questions presented. This, however, is sometimes not acceptable since the resulting product is insufficient to present the depth or breadth of information required. Fore example, only questions dealing with the narrow range of presented information may be asked. The student is not presented with a broad enough spectrum of information to allow the answering of analogous rather than specific questions. Currently, there does not exist a satisfactory method of reducing development time. While some authoring tools exist, these are generally structured so as to minimize the effort involved in presenting information to the user. Test questions and testing methods must still be developed through a very laborious process. Thus, it would be an advancement in the art to have a method which reduces the effort required to develop test questions.

Recently, authoring tools have been implemented that provide for the automatic generation of questions that is related to the lesson material authored. One such method is found in U.S. Pat. No. 5,797,753, issued Aug. 25, 1998, which describes an authoring tool that allows the program to automatically generate question sets to evaluate a learner's review of a subject matter. Unfortunately, the question sets, although designed to be objective in evaluating the information learned by the student, suffer several weaknesses. The first weakness was that the content of the material presented to the student was not placed in any type of contextual relation. The lack of contextual relation turned the experiment merely into a rote learning experience for the student without any logical connection to the overall subject matter of the given topic. Contextual relationships typically pull together the subject matter in a satisfying and useful whole for the student to understand.

Another disadvantage involved the question set generation of a right answer and various wrong answers or distractors. The authoring tool had no problem generating the correct right answer associated with the generated question; however, the distractors were typically selected arbitrarily from the resource material presented to the student without consideration to the context of the question asked. Since the distractors were selected arbitrarily, they did not always have a contextual relation to the question and thus could be eliminated rather quickly as being irrelevant. Accordingly, if all the distractors were selected in such a fashion, then only the right answer would have any sense of relation to the question generated and no fair evaluation of the student's true understanding of the subject matter would be achieved.

Yet another disadvantage of the prior evaluation system is that without the contextual relationships of the underlying subject matter the author was at the mercy of the question generation portion to generate question sets that may provide a fair evaluation of the underlying subject matter. As the question sets would be generated in an arbitrary fashion, it was not always possible to provide specific questions that were necessary to test the student's actual understanding of critical subject matter within the given lesson as required by the author/instructor. In other words, the tests were not standard or fair in evaluating similiar understanding between the different students as the test questions were too random to provide.

Accordingly, what is needed is an authoring tool and tutoring component of that tool that allows the author to provide contextual relations of the underlying subject matter. The contextual relations are then used in the generation of the question sets so that the predicate question has direct relation to the right answer as would all the distracting wrong answers associated with the predicate. Furthermore, what is needed is an authoring tool and question generation mechanism of the authoring tool to provide the author with the ability to review the questions prior to submission to the student, so that the author can verify that a minimum core level of testing and evaluation is being performed by the questions presented. Furthermore, what is needed is a question generation system within an authoring tool that accurately generates questions on topic where all relevant portions of the possible answers to the question have contextual relevance to the predicate question.

SUMMARY OF THE INVENTION

In accordance with the invention as embodied and broadly described herein a method and system for computerized authoring, learning and evaluation is provided. The computerized system comprises a central processing unit and related memory and storage capacity to operate a learning, response, and evaluation system stored in a computer program. The system comprises an authoring portion and a tutoring or presentation portion that allows the author to provide contextual relations to objects within the lesson data for purposes of generating test questions. Furthermore, the contextual relations provide for a nascent index that allows the student to select related objects based on contextual relationships to other objects, thus enhancing the student's learning experience.

The authoring portion of the computer program is encoded in software, which is executed by the central processing unit. Data in the form of text, sound, and graphics such as digitized images, and both still and moving images relating to a central topic are also loaded into the memory of the central processing unit. The inventive system allows for the arrangement and presentation of the data in such a manner as to allow presentation of that information to the user of the presentation portion of the system. To this end, an individual operating an authoring portion of the system reviews the data and assembles the available data into contextual relations. The authoring portion of the system is designed to allow WYSIWYG format allowing the author to review the product as it will appear on the page presented to the user by the presentation portion of the system. Each assembled page may contain text, sound, and graphics in varying proportions.

The process of creating a lesson has two fundamental parts: the data organization phase and the assessment phase. The data organization phase consists of organizing the data on all pages that includes objects that are linked to one another by context or relation, or both.

When the user elects to be evaluated on the information presented on that page, the presentation portion generates questions in context and in relation to the lesson material being studied by the student.

The system then monitors the aptitude of the user in answering the questions and determines whether additional questions are required. The score of the user is recorded. If the user does not desire testing on reviewed material only, the user may elect to take a general test covering all the material to be covered in the selected lesson. For this type of evaluation, the contextual relations of objects for the entire lesson provide source material for the questions and answers that the presentation portion generates.

The system also provides for branching of various points of the lesson. These branches are created in the authoring portion of the system and allow a user to selectively broaden the user's understanding of specific areas by following the branch pages for further presentation of information on a specific topic. Although the branches are created in the authoring portion of the system, the user of the presentation portion of the system may choose not to pursue the branch information depending on the user's general performance on the lesson based on the user's testing on prior pages. For example, if the user had not been successful in quickly learning the material as determined by taking tests on specific, prior pages and the material contained therein, the user might elect to pursue the branch information. When branch information is available it is indicated to the user through the use of a control button located on the page.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
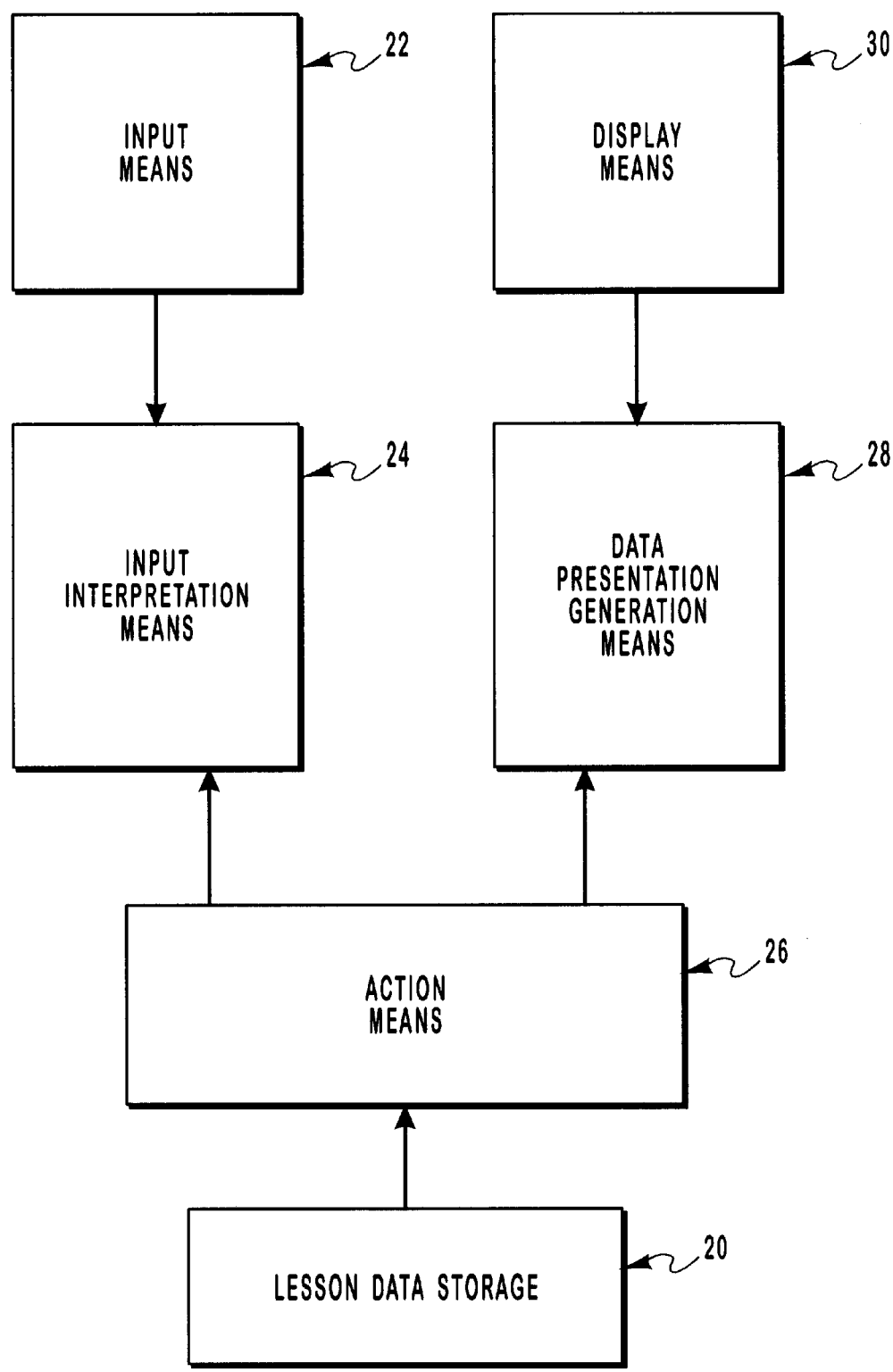
FIG. 1 is a structural diagram of the presentation portion of the system in accordance with the principles of the present invention.

The preferred embodiment of the method and system of the present invention is useful in providing evaluation of the ability of a user to comprehend presented data. In one embodiment, a method and system of the present invention is divided into an authoring portion and a presentation portion. The authoring portion allows a developer or author to take a pool of relevant data and organize it for presentation to a user. The presentation portion takes the data as organized by the authoring portion and presents it to the user. The presentation portion also generates questions which can be used for evaluation and feedback. Rules by which these questions should be generated are developed by the authoring system when the data is organized. It should be emphasized that unlike the prior art where pre-defined questions are simply presented to the user, the instant invention generates the questions to be asked utilizing the information in the lesson.

The data comprises objects that are in the form of text, sound, or graphics. The objects provide the basis for concept items. The concept items are cross-related in contextual relationships. By placing the objects in context with one another, learning becomes relevant and memorable to the student. Context enables learners to integrate the new knowledge they have achieved with their old knowledge. By providing context, the author enhances the presentation portion of the present invention so that the student can master the subject matter more easily and more completely. Concepts are the fundamental building blocks of thought. Teaching and learning is a communication process that involves the analysis, reconstitution, expansion, and manipulation of concepts.

Concepts are placed in two categories for the purposes of the present invention. The first category is conceptual items and the second category is conceptual relations. A conceptual item can be a word, a group of words, a sound, an image, or anything that symbolizes a distinct idea. For example, an anatomy expert may want to work on the conceptual item, tissue. As part of the instructions, the instructor will speak of other conceptual items like elasticity, protection against the external environment, and cells. As the instructor speaks, the instructor conveys that elasticity is an attribute of tissue, that protection is one of its functions, that cells are its constituents. In such a way, the instructor specifies the conceptual relations among associated items. Such a conceptual relation always exists between two related items. Examples of common conceptual relations are whole-part, before-after, bigger-smaller, and so forth. Two items and adjoining relation compose a conceptual relationship.

There are two kinds of conceptual relationships. The first kind comprises general relations. Examples of general relations include whole-part, before-after, bigger-small. The second type of conceptual relationship is specific to intellectual disciplines from anatomy to zoology.

Specialized relationships employ distinctive items and relations. Intellectual disciplines can be better characterized by a few relations than by a multitude of items. If the instructor explicitly teaches the conceptual relations at the beginning of the course, the learners will understand faster and better what to do with the items as they encounter them throughout the course. The instructor can further assist the learners if the instructor can help them to see how the general relations and the specialized ones are inter-related. By creating such analogies, the instructor supplies context and better enables the students to integrate the expert knowledge with their own. Context makes the instructor's specialty relevant to them. Context also reduces the complexity of the student's learning. Thus, context enables the instructor to increase his or her value to the students.

Another benefit of creating conceptual relationships is that it provides a way to quantify knowledge. How much a person knows on a particular item is a function of how many relationships the item participates in. In other words, someone who is aware of five conceptual relationships in which an item participates is not as educated as someone who perceives 100 relationships. The same gauge may be applied to courses and course materials; the more conceptual relationships they contain, the more valuable they are.

The authoring system links conceptual items and relations in such a way as to allow the student to learn by the process of conceptual analysis. Although the instructor may place the knowledge within an alphabetical index, which can be manipulated in a computer system rather handedly; the best strategy for searching and learning is to use the conceptual relations rather than the alphabetical items. The human mind works to search for information based on conceptual relations. This is intuitive to the learners and researchers which leads to greater productivity in the learning environment.

The authoring portion and presentation portion of the present invention require an underlying relational ("ODBC") database. The authoring portion is used to build the software course. The authoring portion includes drop down scripting features to shorten production time of the course development. The authoring portion is used to place objects like sounds, images, animations, movies, and text into the database. The authoring portion also creates hot spots, which are portions of the screen that illuminate so that the learner can understand exactly which part of an object is under discussion. The authoring portion is also used to create a discipline's conceptual relations and where the conceptual items are linked.

The authoring portion and presentation portion both utilize a question generation mechanism that utilizes the relationships defined in the authoring portion to generate questions automatically. Questions are formed when the question generation mechanism suggests possible conceptual relationships based on the actual ones entered earlier in the authoring portion. Those earlier relationships serve as templates for the questions. The question generation mechanism employs the conceptual relations as the stem of the question. It also replaces the predicate item with distractors or false answers.

The questions, however, do not accept just any item as a distractor. The distractors must be conceptually related to the answer. Otherwise, the distractors would be implausible to the question asked. The distractors can be related to the answer in several ways. For example, the relation counterfeit-counterfeit proposes distractors known to confuse novices. The terms "affect" and "effect" are counterfeits. Distractors can also be counterparts from other systems. Counterparts are concepts that serve the same function, but in different systems. For example, the red flanked duiker is a primitive species of antelope that lives in the forests of West Africa. The duiker occupies the same ecological niche as deer in North America, as rodents in South America, as muntjacs in Asia, as well as wallabies in Australia. The question generation mechanism would be able to select a mule deer, a muntjac, a capybara, and a wallaby as distractors for the answer (duiker), by way of a relation such as counterpart-counterpart during the authoring portion.

The presentation portion of the invention also serves as a tutor to the student. The presentation portion reads from the database, pulling out the lessons that the author and authoring portion created together. Afterwards, the student may take quizzes and exams from within the presentation portion.

Furthermore, the presentation portion allows the student to browse the conceptual relationships via an index known as a Nascent Index (TM). The nascent index is a tool that enables learners to explore not only content, but context.

The nascent index functions as an alphabetic index, listing key terms and enabling the student to move directly to the instruction on the conceptual item. The nascent index also functions as a table of contents, enabling the student to understand the logical structure of the course. The nascent index functions as a glossary where the definition of each term can be easily viewed. With the table of contents and alphabetical index, the student can select any subject within the nascent index and then be quizzed subsequently.

Significantly, the nascent index leverages the conceptual relationships to enable the students to pursue a new kind of search. The student can click on a term in a tree view of the nascent index to expand and reveal its conceptual relationships, or its context. The students expand and contract context as their questions emerge. This allows students to explore the course material conceptually, intuitively. This method eliminates the long-standing problem of alphabetical indexes where the student must know the pronunciation or spelling of a term before it can be retrieved. Further, this method of searching relegates the alphabetical indexes to a logical, consistent role, providing just the starting point of a conceptual search.

It is possible to develop a specialized hardware platform to be used for the instant invention. However, the authoring portion and the presentation portion are preferably designed to be used in conjunction with a general purpose computer. Although it is possible to implement the authoring portion and the presentation portion in such a manner as to run on any general purpose computer, currently the preferred hardware platform is a personal computer such as one that is compatible with either an IBM® personal computer or an Apple® personal computer or equivalents thereto. In the presently preferred embodiment of the authoring system and the presentation system, extensive use of graphics (both video and illustrations), sound, and textural information is employed. In addition, the presently preferred operating environment for both the authoring portion and the presentation portion is a graphical user interface operating environment such as Microsoft® Windows® or the Apple® operating system. Thus, hardware platforms which are capable of supporting these capabilities are presently preferred.

Throughout this disclosure, such a hardware platform and operating environment are presumed. Thus, structures such as display mechanisms, input mechanisms, graphics capability, sound capability, and the like are presumed. Furthermore, the hardware platforms are presumed to include the standard structures normally expected such as disk drives, internal memory for program and data storage and the like.

Referring now to FIG. 1, a structural diagram of the presentation portion is illustrated. As previously described, the presentation portion is designed to take lesson data as organized by the authoring portion and allow the user to interact with the data. The presentation portion is encoded in software which is loaded onto the hardware platform to be executed by the CPU. The software may reside on a plurality of storage media known to those skilled in the computer art. By way of example and not limitation, such storage media can included, fixed or removable disks, CD-ROM, DVD, ROM, RAM, or any other computer readable media.

In FIG. 1, the data as organized by the authoring portion is illustrated by the lesson data store 20. The lesson store 20 is typically located on a permanent storage media of the computer such as a removable or fixed disk or CD-ROM. As the data is utilized and presented to the user for interaction, the data is typically loaded from the disk into the computer memory. The data is stored in the ODBC database, an instance of which is Visual FoxPro®, provided by Microsoft Corporation of Redmond Washington.

Input is received from input means 22 and passed to input interpretation means 24. Input means 22 comprises the input means of the associated hardware platform. This can include such items as a keyboard, mouse, pen, voice, and the like. Input interpretation means 24 translates the input received and determines what actions should be taken. The appropriate information is then passed to action means 26, which performs the desired action.

Action means 26 extracts the appropriate information from lesson data store 20 to fulfill the desired task. After completing the desired task, which may involve processing the data extracted from lesson data store 20, the appropriate information is then passed to data presentation generation means 28. Data presentation generation means 28 formats the data in an appropriate manner and displays the data to the user via a display means 30.

Display means 30 comprises the means by which the authoring, learning, and evaluation system presents information to the user. Capability nominally included in the embodiment is a visual display device and sound device capable of presenting text and graphics and sound, both illustrations and video.

Figure 2:
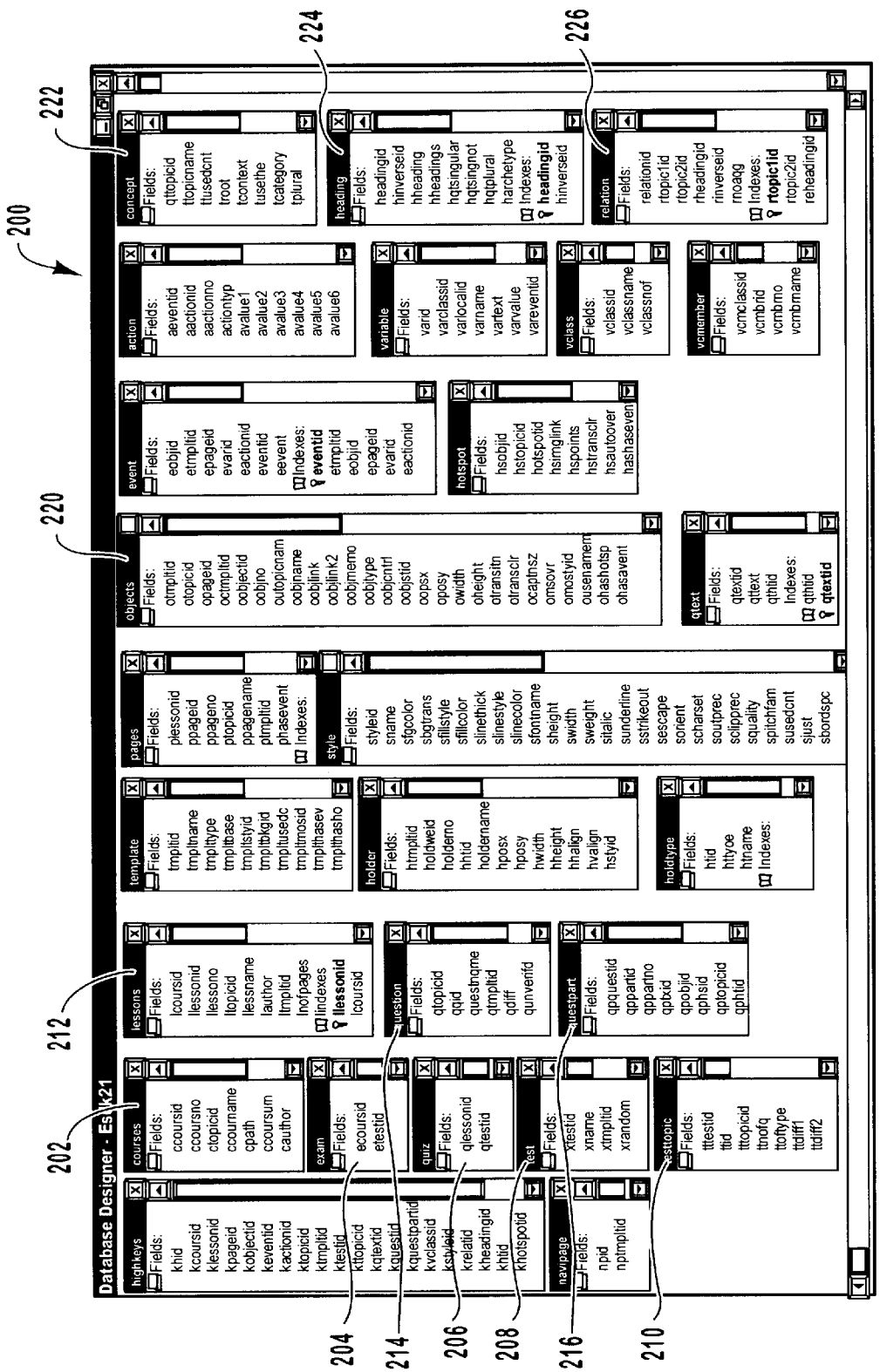
FIG. 2 is a graphical user interface image of selected fields utilized within the database to provide context relation in accordance with principles of the present invention.

FIG. 2 illustrates an image view of a graphical user interface for the aspects of a database 200. Within database 200 are a plurality of components that are used to build the authoring portion and the presentation portion of the present invention. The components include a course component 202, an exam component 204, a quiz component 206, a test component 208, a test topic 210, and a lesson topic 212. Additional components include a question component 214 and a question part component 216. Four important components of database 200 include object component 220, concept component 222, heading component 224, and relation component 226. The remaining components are used to define keys, navigational pages, templates, holders, to define pages and style type, as well as to define text, events, and hot spots as are described and disclosed in U.S. Pat. No. 5,890,911, previously incorporated by reference.

Figure 3:
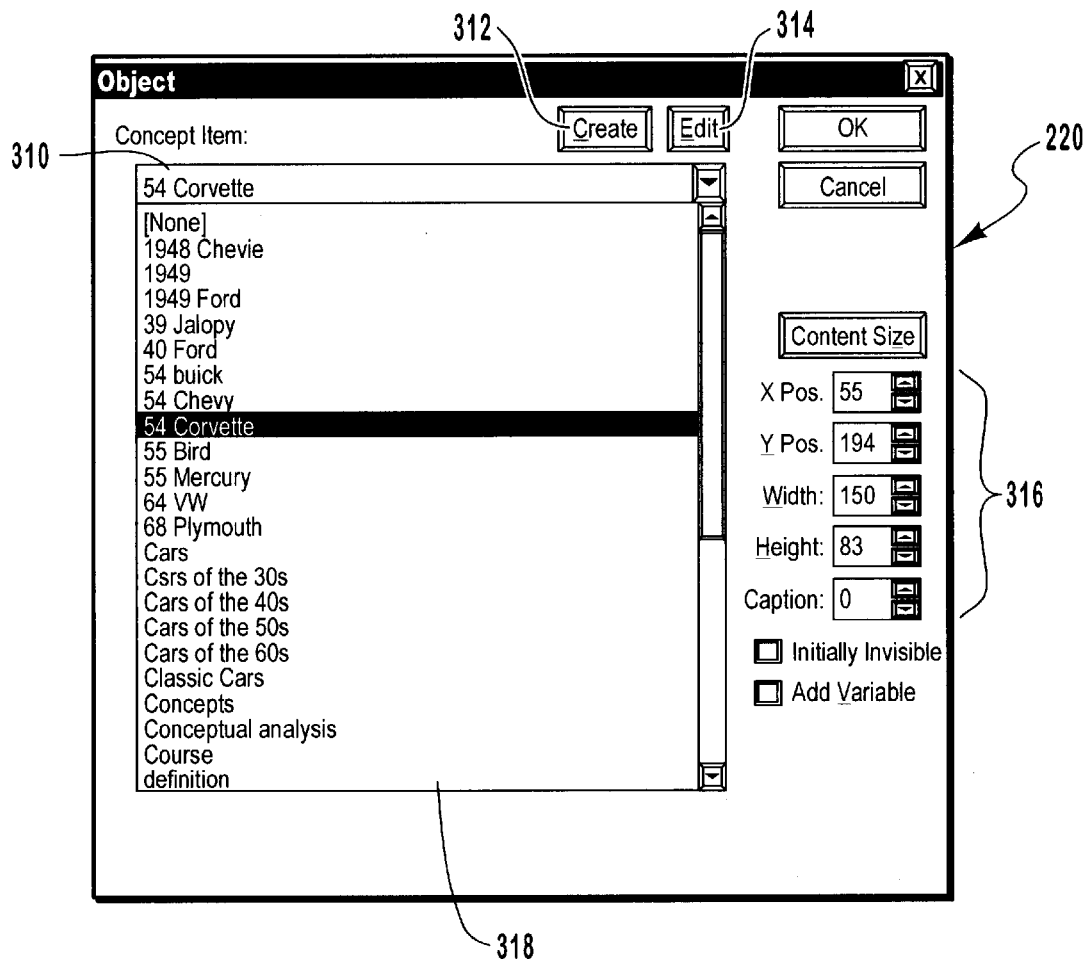
FIG. 3 is a graphical user interface image of defining an object with an associated concept as well as providing placement of the object within the lesson in accordance with principles of the present invention.

Object component 220 is represented in FIG. 3. FIG. 3 depicts a graphical user interface for the author where an object 310 is entered in the object field just below the concept item. Below the object are additional concept items that serve as objects. In this example, Classic Cars is the title and a plurality of classic cars from different eras defined within the concept item field. Additionally, relationships such as categories of eras are defined as objects. Once an object is selected, the author activates either the create icon 312 or the edit icon 314 in order to provide a proper relation of the object 310 with the other objects within the topic. The X position, Y position, width position, height, and caption found in serve in the editorial tool element 316 allow for the placement of a particular object 310 on a given page in accordance with principles of the present invention. Once the particular object 310 has been selected and placed (e.g., located on a desired page) within the content of the lesson material, the author then can add another object 310 or modify a pre-existing object 310 from the list of objects shown in list 318.

Figure 4:
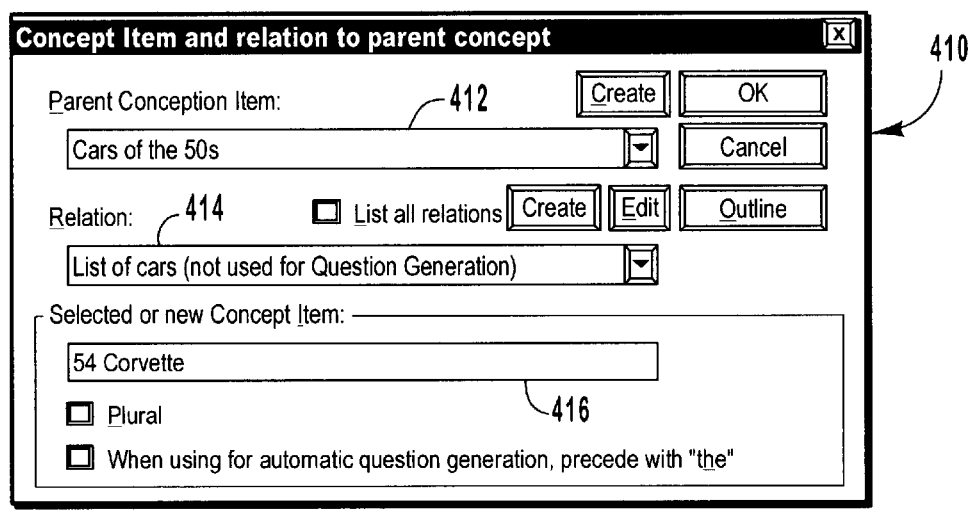
FIG. 4 is a graphical user interface image of defining object relations for question generation and indexing in accordance with principles of the present invention.

FIG. 4 depicts a concept item and relation to a parent concept field 410. The first field is parent concept item 412. In this example, the parent concept is Cars of the 50's. The next field is relation 414. In relation field 414, a list of cars has been defined and has been qualified not to be used for question generation. The selection of "not to be used for question generation" is an option available to the author for when a relation that exists isn't of interest to the author for testing or other learning purposes, but merely provides a link for indexing or distractor selection. A selected or new concept item field 416 is provided and it is equivalent to concept item field 310 of FIG. 3. Again, the concept item and relation may be modified or created by selection of either the create button or edit button. Upon creation of a relation for a parent concept with a new concept item, a new window is shown in FIG. 5.

Figure 5:
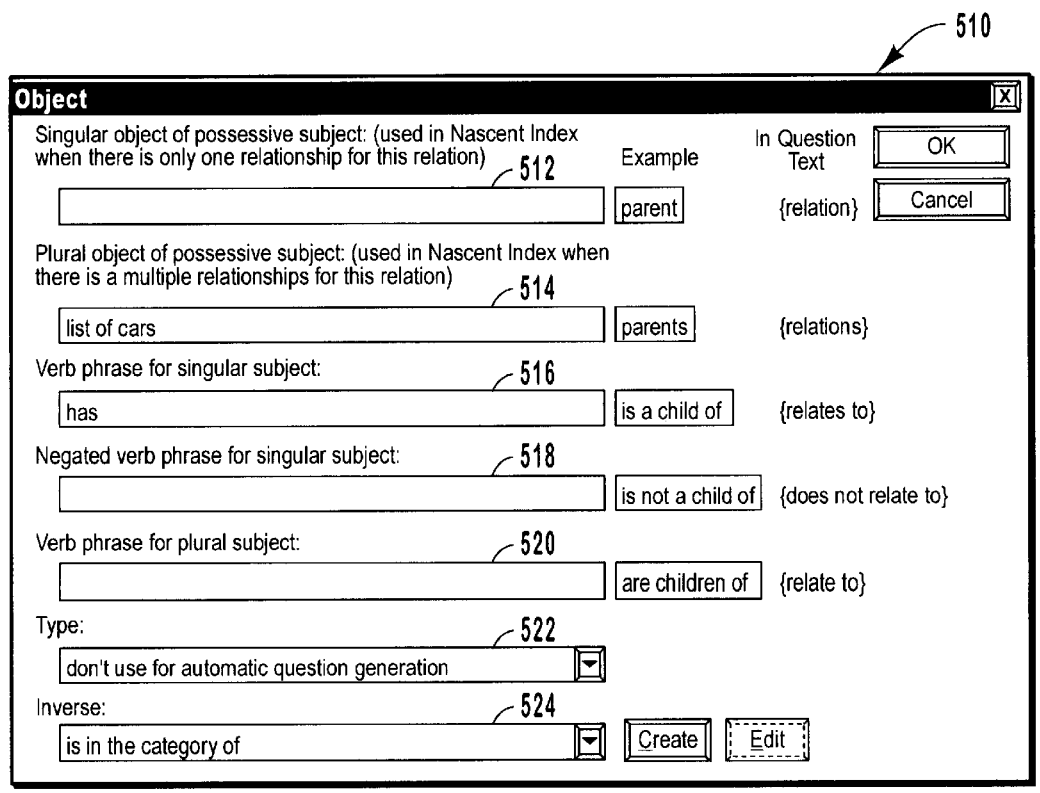
FIG. 5 is a graphical user interface image of defining an object with an associated concept as well as providing placement of the object within the lesson in accordance with principles of the present invention.

FIG. 5 depicts the relation, phrase for nascent index, and automatic question generation field 510. Field 512 defines the singular object of possessive subject for use in the nascent index when there is only one relationship for this relation. Field 514 defines plural object of possessive subjects for use in the nascent index when there are multiple relationships for this relation. Continuing with the given car example, the plural object of possessive subject is list of cars. Next, field 516 defines the verb phrase for singular objects and in the given example it is "has." Field 518 provides for a negated verb phrase for singular subjects, which means that a subject placed within this field would not be a child of or does not relate to the parent of either fields 512 or 514. Next, field 520 defines the verb phrase for the plural subject. Field 522 defines the type of subject. In the given example, the object has been selected "not be used for automatic question generation". Lastly, field 524 defines the inverse of the object, which in this example is in the category that defines the relationship inverse.

Figure 6:
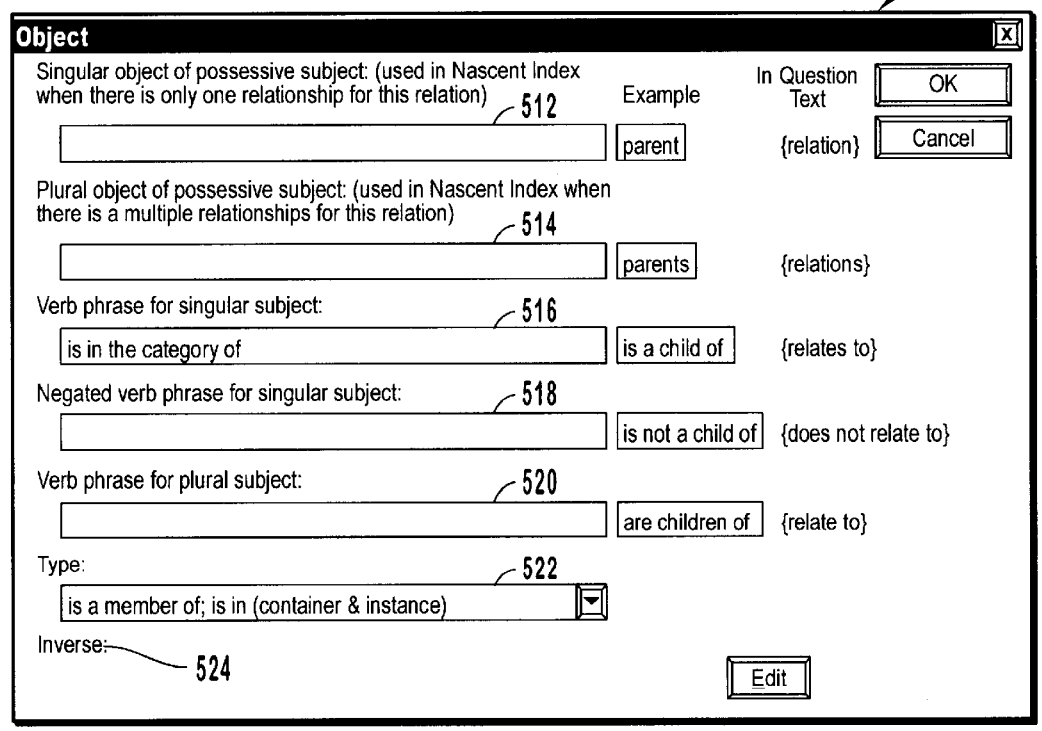
FIG. 6 is a graphical user interface image similar to FIG. 5 of defining an object with an associated concept as well as providing placement of the object within the lesson in accordance with principles of the present invention.

FIG. 6 is the same as FIG. 5 in fields and numbering. In the example of FIG. 6, the verb phrase for a single subject has been selected to be "is in the category of." Next, in field 522, the type is defined to be is a member of: is in (container & instance). No inverse field 524 is available in this option and therefore the inverse field is closed.

The author is free to select from a plurality of relationship types and a few examples are provided as follows. One option is "don't use for automatic question generation," which prevents the object from being used during the automatic question generation portion of the invention. Additional relationship builders include "is also known as," "is similar to, but opposite feeling, connotation," is like (analogous to, is like, parallel, corresponds), "is defined or explained as," "is translation," "is represented by (symbol)," "is remembered by (mneumonic)," and "is opposites with (inverse)." Additional builder strings include is confused with (counterfeit), is compatible with (requires, wants, needs), is incompatible with (dislikes, undesirables), performs, (function, purpose, what it does), is a result of (parent/child, produces/produced by), is a factor, reason, has an effect, plays a role, is a part of (whole & parts), is a member of, is in (container & instance), is a supporter (subscribes to). Additional connectors include is a kind of, is an example of (genus and species), is an attribute of (unity & attributes), has something in common with, is often accompanied by (companions, commonly associated with), is after/before, follows/proceeds (order related), is help for. The list of connectors is not deemed to be exhaustive and other relationships will be evident to those skilled in the art.

Figure 7:
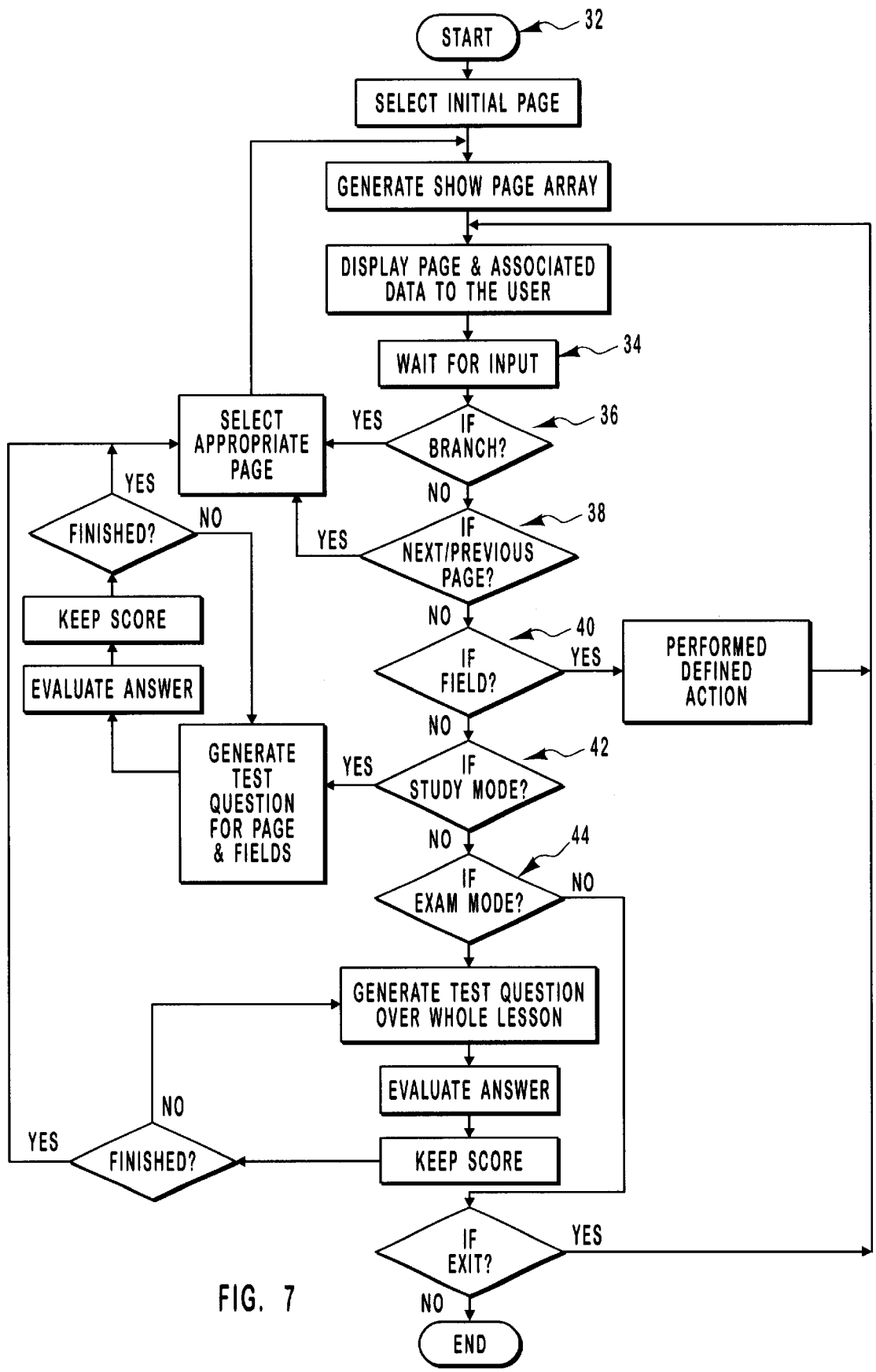
FIG. 7 is a basic flow chart showing how a student would execute options available in the presentation portion of the present invention.

In order that the authoring, learning, and evaluation system may be more fully disclosed, FIG. 7 presents a basic flow diagram of one embodiment. When the system is started, the flow begins at step 32 labeled start. The system then selects the initial page from lesson data store 20, generates the show page array for that page and displays the page with its associated data to the user. Within the context of this patent, the terms "page" refers to a unit of organized information. Pages may or may not be presented to the user. A page comprises various informational resources. These resources can include text, graphics, and sound. Within the scope of this patent, graphics refers to both illustration graphics suck as a picture, and video graphics. Pages may also have identifiers associated with them. Examples of identifiers are discussed in conjunction with the authoring portion later.

Because a page can contain many different resources, a method must be developed for ensuring that the resources are presented to the user in the appropriate format and with the appropriate control structures which allows the user to access the resources. In one preferred embodiment, one such method comprises a show page array. The show page array can serve as a repository for the information needed to appropriately display the page, with its associated resources, to the user. For example, the show page array can contain such information such as where the graphic on the page is to be located, where the text on the page should be located, whether any sound associated with a page should be played immediately when the page is displayed, or whether a control button should be displayed which will allow the user to hear the sound when the control button is activated. Other information, such as branching information, control button layout, and the like, may also be included in the show page array. It is to be understood that there are other ways in which the resource information can be compiled and the concept of the show page array is given by way of example and not limitation.

Once the information of the page is displayed to the user, step 34 is entered where the system waits for the information from the user. Depending on the information displayed, and the resources available on the page, several actions may be possible. By way of example and not limitation, FIG. 7 shows five possible actions the user can initiate.

If the data in the lesson has been organized in a manner which allows branching from the current part of the lesson to another part of the lesson, the user may elect to take the branch as indicated by branch step 36. If such action is initiated, the system will select the appropriate page from lesson data store 20, generate the associated show page array and display the page to the user. By way of example, and not limitation, if a branch is taken, control buttons may be added to the display which allows the user to return from the branch to a predefined location in the lesson. Such a predefined location may be a page where the branch initiated or to a different page in the lesson. Furthermore, it is anticipated that when a user has taken multiple branches, multiple control buttons may be displayed to the user in order for the user to return to various levels of the lesson.

In one preferred embodiment, the branching capability provides a robust manner in which to hyper sequentially traverse information related to the current page. As used within this patent, "hyper sequentially" describes a manner of organizing pages so that they can be presented in a non-sequential manner. In addition to branching from the current page to another point in the current lesson, embodiments within the scope of the instant invention also allow branching to relevant information in an entirely different lesson. Furthermore, other embodiments within the scope of the instant invention allow branching to a location where questions covering the relevant information on the page are generated and presented to the user. In still other embodiments, it is contemplated that the branching capability could be utilized to branch to an entirely different lesson and questions on the relevant part of the entirely different lesson would be generated and presented to the user. In still other embodiments of the present invention it is anticipated that a branch could take the user to a point in the present or another lesson after which the system would sequentially present pages of data relevant to a particular topic without any further input from the user. Thus, a branch can take a user to a particular portion of the lesson where a "slide show" type presentation can be made.

In addition to the robust branching capability, embodiments within the scope of the instant invention contemplate a robust return capability. Thus, not only may a user be presented with control buttons which return the user to a predefined location, but also when the end of a branch is reached, the user may be automatically returned to a predefined location. Such a predefined location can be any where within the current lesson or, perhaps, in a different lesson.

Another option is for the user to display the next page or previous page of the lesson. This step is indicated by next/previous page step 38 in FIG. 7. If this option is selected, the appropriate page will be extracted from lesson data store 20 and presented to the user as previously described. If there are no more pages to be displayed, other action may be initiated. For example, the current page can be displayed. As another example, the display portion may enter a mode where the user is asked questions. As a still further example, when the option is not available, the control button can be disabled.

In order to provide extended capability beyond the basic resources to a page, special regions called "hot spots" may be defined on the page. When these regions are selected or activated by a user, an action can occur. For example, the branching capability previously discussed can be implemented via a hot spot. When the user activates this hot spot, the previously defined branch would be taken.

Another potential use of a hot spot is as a field. A field hot spot can be used to display additional information when activated. For example, when the field is activated, a sound may be presented to the user. As another example, a video may be displayed, or a text box or other information may be displayed. Thus, fields can be used to enhance the presentation of information to a user. Returning to FIG. 7, field step 40 shows that the action which has been bound to the field is performed and the information on the page continues to be displayed.

Other uses for such hot spot regions may also be developed. For example, the concept of control buttons which direct the system to perform certain actions can also be implemented via this technology. The examples given are thus not to be construed as limitations in this patent.

Figure 8:
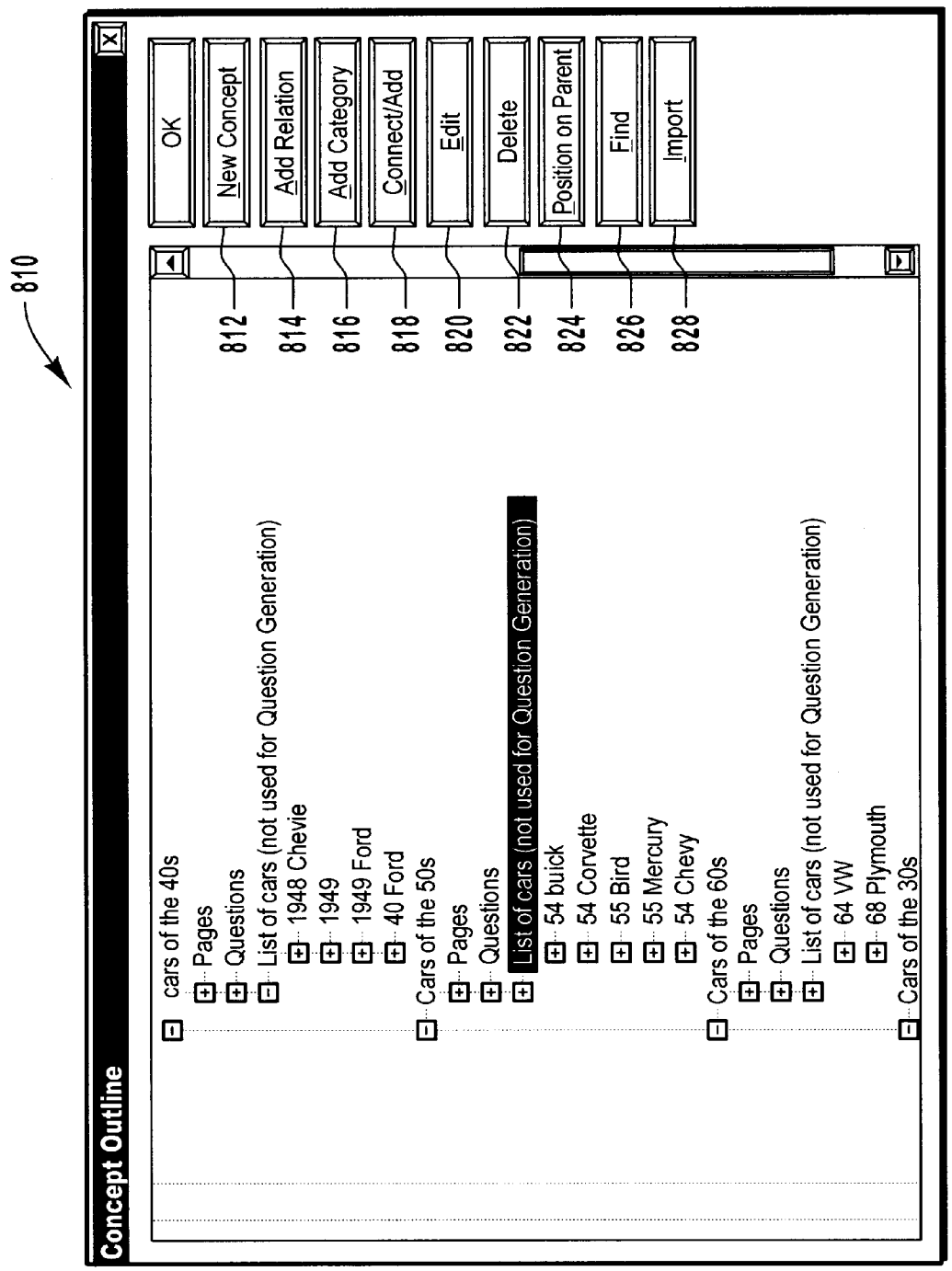
FIG. 8 is a graphical user interface image of a concept outline utilized for question generation and nascent indexing in accordance with principles of the present invention.

Once the author has provided enough topics and relations to the objects, a concept outline 810, as illustrated in FIG. 8 is generated from the information input by the author. FIG. 8 is a GUI depiction of a concept outline 810 in accordance with principles of the present invention. In the example of the classic cars, an outline of the cars defined by particular times is disclosed. For purposes of illustration, the cars are defined in decades such as cars of the 40's, cars of the 50's, cars of the 60's, and cars of the 30's. Within each decade is included a page location as well as questions associated with that era. A list of the cars entered is also provided as shown. At any time, the author can add a new concept via new concept icon 812, may add a relation via at relation icon 814, add a category via icon 816, connect or add an object or concept to one another via connect/add icon 818, edit any object via edit icon 820, delete a field via delete icon 822, or position an object via Position on Parent icon 824. Additional functions include finding an icon via find icon 826 or importing a concept or object from another field via import icon 828. Concept outline 810 further serves as the nascent index previously described.

Figure 9:
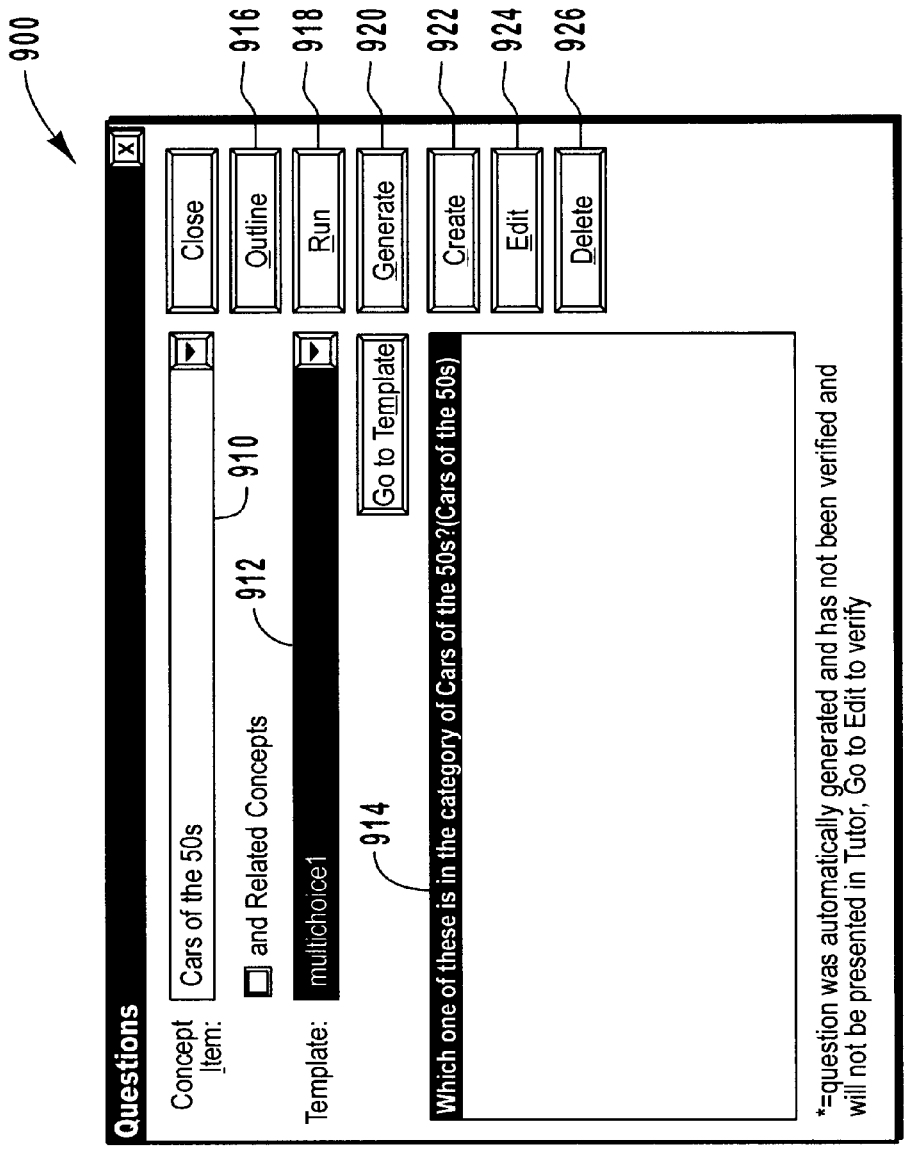
FIG. 9 is a graphical user interface image depicting a question based on a concept item placed within a template format in accordance with principles of the present invention.

Next, a discussion of question generation is presented. FIG. 9 illustrates a GUI screen of the question selector 910 in accordance with the present invention. Question selector 910 includes a concept item field 912, which serves as the topic for the question to be generated. The author can select from a plurality of question types in question type field 912, which include multiple choice, matching, true/false, fill in the missing words, or essay type questions. Question field 914 displays the actual question generated for review by the author. In this case, the question is: Which one of these is in the category of cars of the 50's? Question selector screen 910 further includes an outline icon 916 to view the types of questions for the concept item in outline form. A generate selector 920 is activated to perform a question generation operation. A run icon 918 allows the author to select various questions for review. Additional buttons include create 922, edit 924, and delete 926, which functions have previously been described. Each question that is automatically generated by the question generation mechanism of the present invention is noted as not being verified by the author and will not be presented in the learning portion of the invention. At this point, the author selects the edit button 924 to verify that the question conforms with the author's goals of evaluating the student's learning of subject matter studied. An example of verification is depicted in FIG. 10.

Figure 10:
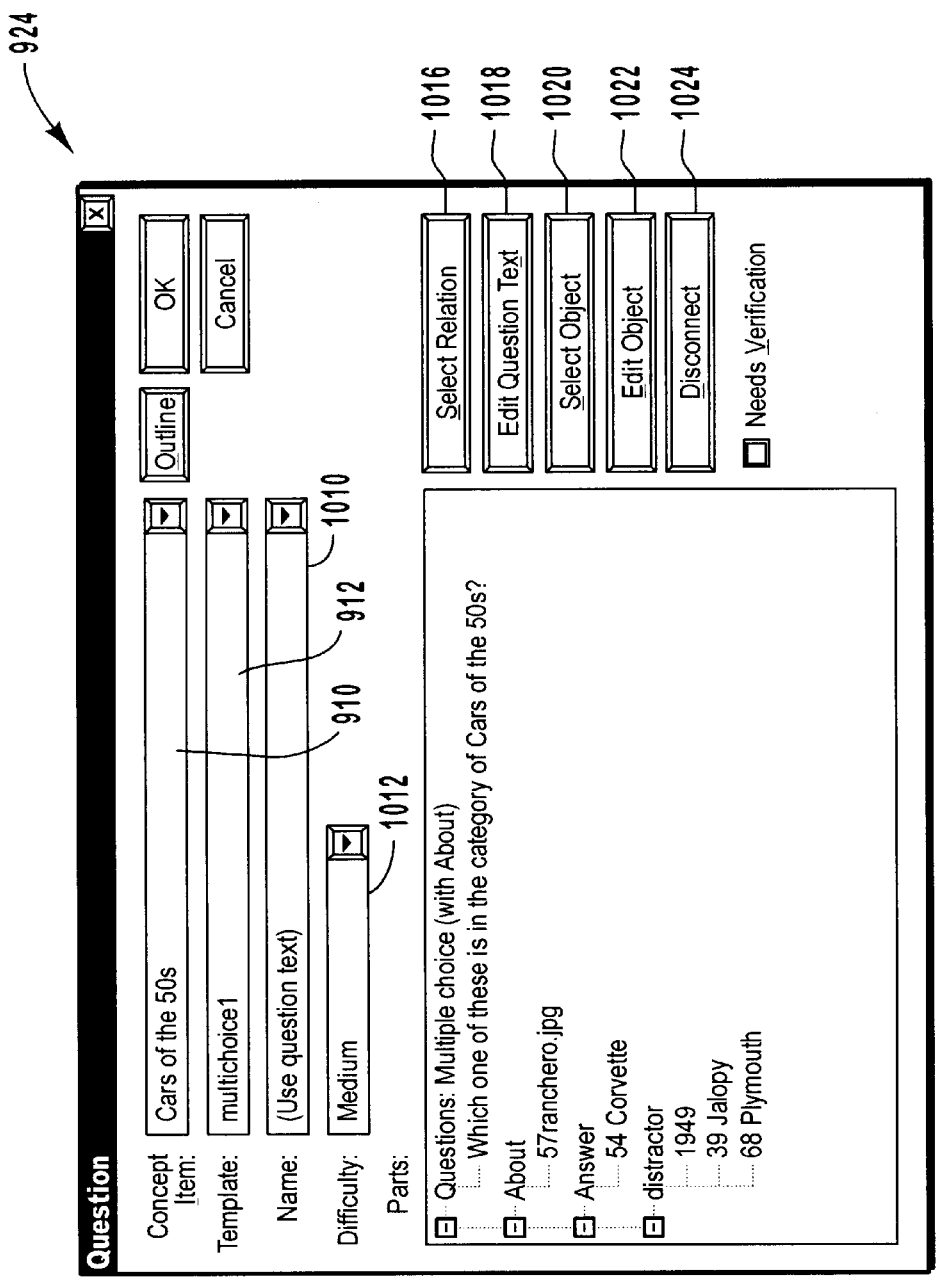
FIG. 10 is a graphical user interface image depicting the question parts utilized in FIG. 9.

FIG. 10 is a GUI screen of question verification and edit option 924. The question verification includes concept item 910, template 912, name field 1010, difficulty field 1012, and parts field 1014. Name field 1010 defines the name of the question asked. Difficulty field 1012 selects the level of difficulty defined by the author for the question selected. In this example, the question is of a medium difficulty. Easy, medium, hard, and challenging are types of difficulty levels. Other types of difficulty levels will be evident to those skilled in the art and are not intended to limit the scope of the present invention. Parts field 1014 lists the question type, what the actual question is, what the question is about, the answer to the question, and selected distractors associated with the question. In the example depicted in FIG. 10, the question is: Which one of these is in the category of cars of the 50's? The answer is the '54 corvette and the distractor cars include: an automobile selected from the year 1949, a 1939 jalopy, and a 1968 Plymouth.

The present invention improves upon the prior art in that the distractors selected in FIG. 10 are in the same context as the answer of FIG. 10. Namely, each distractor happens to be a car, albeit in a different era than the era of the question asked. In selecting the question, the question can present either an image of each of the cars to test the learner or student's knowledge of being able to identify a car on sight. Other options include providing video images of the car or audio sounds of the car for identification by the student.

The question field 924 allows the author to modify the question. This is achieved through changing the relation via select relation button 1016, editing the question text via edit question text button 1018, select an object via select object button 1020, edit an object via edit object button 1022, or just disconnect via disconnect button 1024. Should the author select edit question text button 1018, the authoring portion directs the author to a GUI screen allowing the author to evaluate questions in a general scope as shown in FIG. 11.

Figure 11:
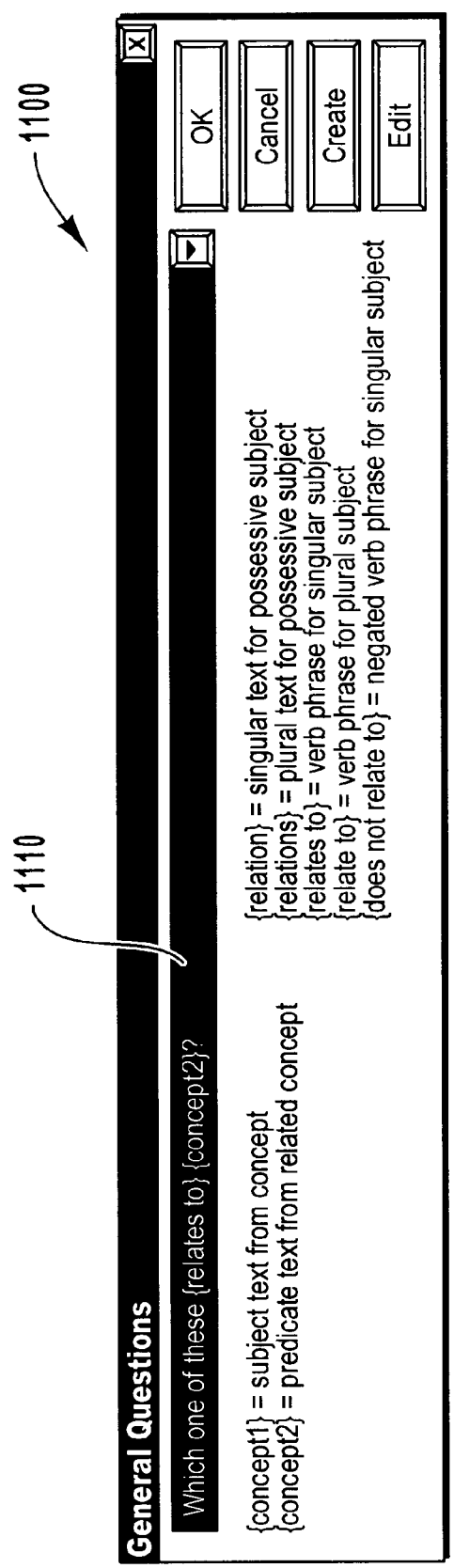
FIG. 11 is a graphical user interface image depicting the general question outline procedure for generating questions in accordance with principles of the present invention.

FIG. 11 depicts the general questions 1100. The general question field is shown in field 1110. The example in this illustration is: Which one of these (relates to) (concept2)? Where (concept2) is the predicate text from the related concept and (concept 1) is the subject text from the concept. Once the author is satisfied with the general question type, the author can modify the specifics of a question. A sample question illustrative of the question generator mechanism within the authoring portion of the present invention is depicted in FIG. 12.

Figure 12:
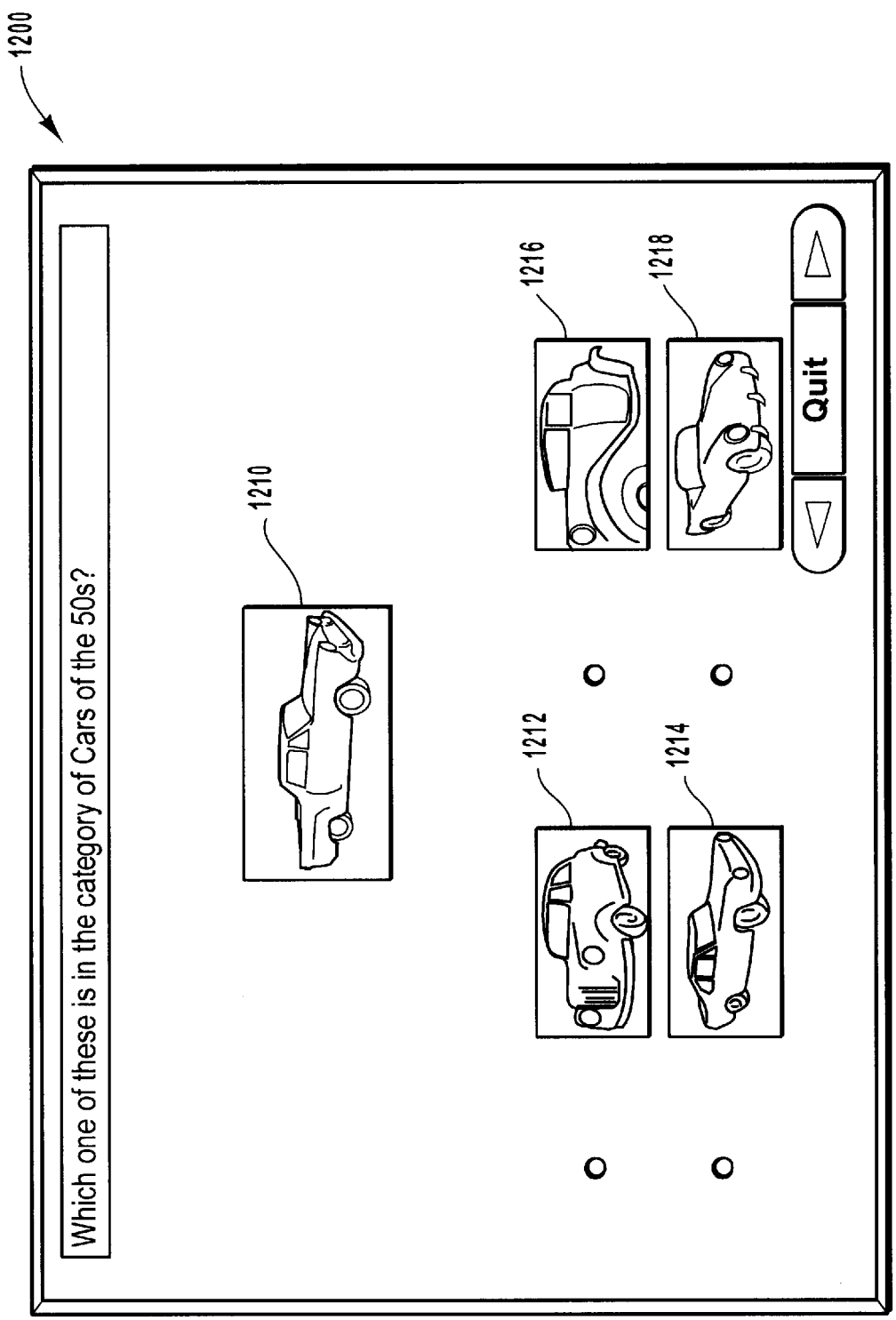
FIG. 12 is a graphical user interface image of a sample question generated and displayed for the student according to principles of the present invention.

FIG. 12 illustrates a graphical view of question 1200 as generated by the implementation demonstrated in FIGS. 9–11. The question is: Which one of these is in the category of cars of the 50's? A representative car is illustrated in the image 1210. Possible answers are depicted in images 1212–1218. In this example, images 1212–1216 are distracter answers while image 1218 is the right answer.

As demonstrated in the background section, current learning, response, and evaluation systems have limitations on their ability to provide effective feedback to a user. In order to overcome these limitations, one preferred embodiment contemplated within this invention has the ability to enter a study mode for a student-selected topic. In FIG. 7, this capability is represented in study mode step 42. This mode can be available at virtually any point in a lesson. When study mode is selected by a user, the presentation portion generates topical test questions for the page and fields currently displayed. The user selects an appropriate answer which is evaluated. The system keeps track of the score achieved by the user.

In study mode, it is possible to develop a wide variety of exit rules. Exit riles are designed to exit the study mode when a specific event occur. For example, a control button may be provided which allows the user to exit the study mode at will. As another example, the system may be directed to ask a predetermined number of questions and exit when the questions have been asked. As still another example, the system may ask a predetermined number of questions after which the user's score is evaluated. If the score is above a certain threshold, then the study mode will be exited. If, however, the score is below the threshold, then an additional set of questions may be asked.

In one embodiment, the exit rules are determined by the author when the lesson is constructed. In another embodiment, the exit rules are set by the user. In another preferred embodiment, different aspects of the exit rules are determined by the author and the user. As demonstrated by these examples, a wide variety of exit rules are possible and the examples given should not be interpreted as limiting the scope of this invention.

Upon exiting from the study mode, a wide variety of options are available. In one embodiment, upon exiting, the presentation portion returns to the page which was displayed before study mode was entered. In another embodiment, the presentation portion displays the next page of the lesson. In still another embodiment, the user is presented with a list of options from which to choose what action the presentation portion should take.

Since scores are evaluated when the study mode is entered, if a user utilizes the study mode for most or all of the information presented, an overall score covering the material in the lesson can be presented to the user without the need to resort to an overall examination on all material contained in the lesson. Furthermore, if desired, the user can receive a current score at any point in the lesson. This ability to provide scoring information at any point in the lesson greatly increases the effectiveness of feedback to the user. The user is able to evaluate how well the material is being learned while the learning process is still occurring. Thus, users are more likely to continue to study information that is not well learned rather than moving on to other topics. This ability, then, represents a significant improvement over tests where feedback is provided to the user after the focus of learning has shifted to new material.

A wide variety of scoring rules may be developed for use with the instant invention. In one embodiment, simple rules are contemplated. Such rules can include keeping track of the number of questions answered correct and the number of questions answered incorrect. If questions of a multiple choice format are asked, the question can be allowed to stay on the screen until the correct answer is selected. In this instance, a variable number of points may be awarded based on how many tires it takes to select the right answers. For example, if the correct answer was selected on the first try, 4 points may be awarded. If selected on the second try, 2 points may be awarded. Finally, 1 point may be awarded if the answer is selected on the third try. No points would be awarded for any subsequent selections.

More complicated scoring rules may also be developed. Such scoring rules include rules which deduct the number wrong from the number right. Further, testing theories could be used to develop still more complicated rules. Such rules would be useful, for example, if the system was being used to determine the likelihood of mastery of a given subject. Further, such rules would be necessary if scores from one person on one test were to be scaled relative to scores from another person on another test in order to standardize a test. Those skilled in the testing art would be able to develop such scoring rules.

Finally, a wide variety of options can be developed to display scoring information. In one embodiment, scores are displayed continually. In another embodiment, scores are displayed when requested by a user. In still another embodiment, scores are unavailable to the user and are only available to an instructor or teacher. Further, scores may be cumulative, or may be broken down by topic or section.

In order to further enhance feedback, it may be desirable to present a test covering all information in the lesson. In one preferred embodiment, this is achieved by entering an exam mode. In FIG. 7, this mode is illustrated by exam mode step 44. When exam mode is entered, questions over all material in the lesson are generated and presented to the user. Answers to the questions are evaluated and a score is kept. The score may be presented to the user as questions are asked and answered, or the score may be held until the exam mode is exited. In addition, the score may be held until the details are requested by the user. Finally, the score may be unavailable to the user and only available to a teacher or instructor.

As in the study mode discussion, the exam mode may be provided with exit rules. The exit rules may be determined by the author, the user, or a combination of both. Again a wide variety of exit rules are possible. By way of example and not limitation, one possibility is to exit the exam mode when requested by the user. Another possibility is to exit the exam mode when a determination has been made that the user has either mastered the material or has clearly not mastered the material. Such an exit rule would probably require application of various testing theories which are known to those skilled in the testing art. As another example, the exit rules may require a certain number of questions to be answered correctly before the mode is exited. As a final example, a specified number of questions could be asked, and depending on the score achieved, the mode can be exited or further questions can be asked.

Upon exiting, a determination must be made as to what should occur. For example, one possibility is to exit the lesson when the examination mode is exited. Another possibility, is to allow the user to return those sections of the material where further practice is needed. For example, if a user determines that they do not know the answer to questions regarding a certain topic, the user may chose to exit in such a manner as to bring the information on that topic to the screen. Alternatively, it may be possible to exit the exam mode in such a way so as to start another lesson. Other exit rules may be available and the type of exit rule employed should not be interpreted as limiting the scope of this invention.

It will be appreciated that the learning, response, and evaluation system can have numerous other capabilities. For example, lessons can be organized in order to present a table of contents to enable the user to go directly to that part of the lesson which is of most interest. In addition, a search capability may be included. Such a capability may be structured in order to allow the user to find a particular word or topic. Alternatively, such a search capability may allow the user to locate and go to a particular page in the lesson. Furthermore, a scan capability can be also included. Such a capability would allow the system to begin at a particular point in the lesson and present a page for a length of time before automatically presenting the successive page. In this manner, a user can quickly review a particular set of pages in a lesson without manually moving through the pages.

In addition to these capabilities, it is also possible to include a third testing capability. For example, the presentation portion of the system could be structured to keep track of the information seen by the user. A test could then be generated which covers only that material in which the user has studied. In addition, the system can keep track of the scores during the study mode and the exam mode or in a mode which tests on the materials seen by the user, the system would then emphasize questions where the user has displayed a particular weakness. In this manner, the user would be queried more on the material they had yet to master than on the material they had already mastered.

Figure 13:
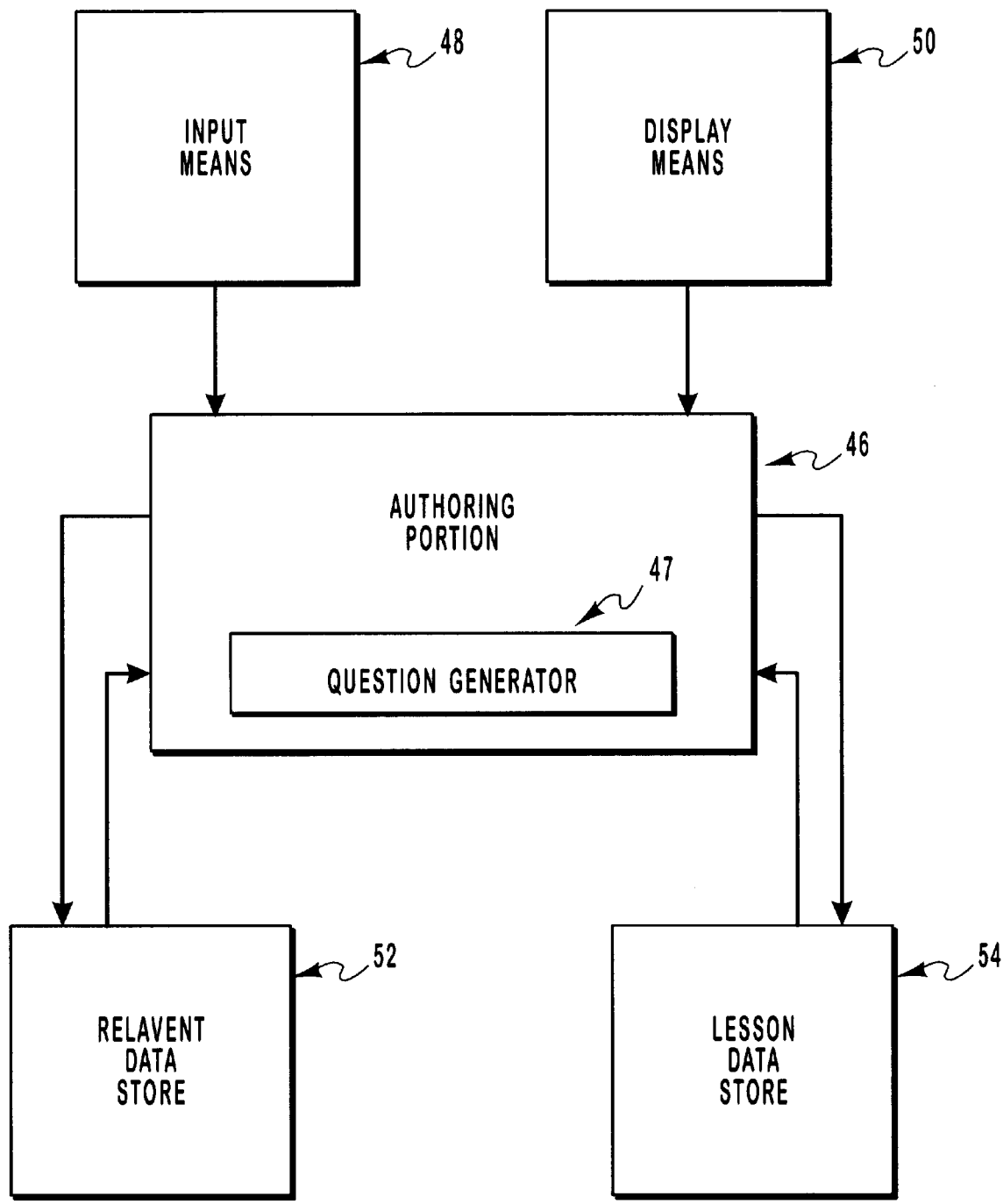
FIG. 13 is a structural diagram of the presentation portion of the system in accordance with the principles of the present invention.

FIG. 13 presents a top level structural diagram of the authoring portion of the learning, response, and evaluation system. As previously discussed in conjunction with the presentation portion, authoring portion 46 is also encoded in software which is loaded onto the hardware platform to be executed by the CPU. The software may reside on a plurality of storage media known to those skilled in the computer art. By way of example, and not limitation, such storage media can include fixed or removable disks, CD-ROM, ROM, RAM, or any other computer readable media.

Authoring portion 46 receives input from input means 48 and displays information on display means 50. Input means 48 and display means 50 are part of the hardware platform as previously described with regards to the presentation portion. Thus, input means 48 comprises such elements as a keyboard, mouse, pen, voice input system, and the like. Display means 50 comprises such elements as a screen to display text and graphic material. Display means 50 also comprises means to play a sound for the user. Sounds include any sound which may be relevant to the lesson such as voice or music.

As illustrated structurally in FIG. 13, the primary focus of the authoring portion is to take data from relevant data store 52 and organize it into the proper format for inclusion in lesson data store 54. Lesson data store 54 is simply a name for the file containing the lesson data. Relevant data store 52 and lesson data store 54 typically reside on the hardware platform's permanent storage media such as a removable or fixed disk or CD-ROM. The specific concepts embodied in this invention are designed to provide an intuitive set of tools which allows an author to quickly and easily take a pool of data from the relevant data store and organize it into a lesson. The inventive concepts embodied herein allow the lesson data store to be produced without conventional programming. In combination, the concepts presented and embodied in this invention provide two fundamental benefits over the prior art. First, the time needed to develop a lesson by organizing relevant data into lesson data is dramatically reduced. Second, because the inventive concepts are combined in a unique manner, use of the authoring portion is highly intuitive. Thus, the time it takes to learn how to operate the authoring portion is dramatically reduced.

Figure 14:
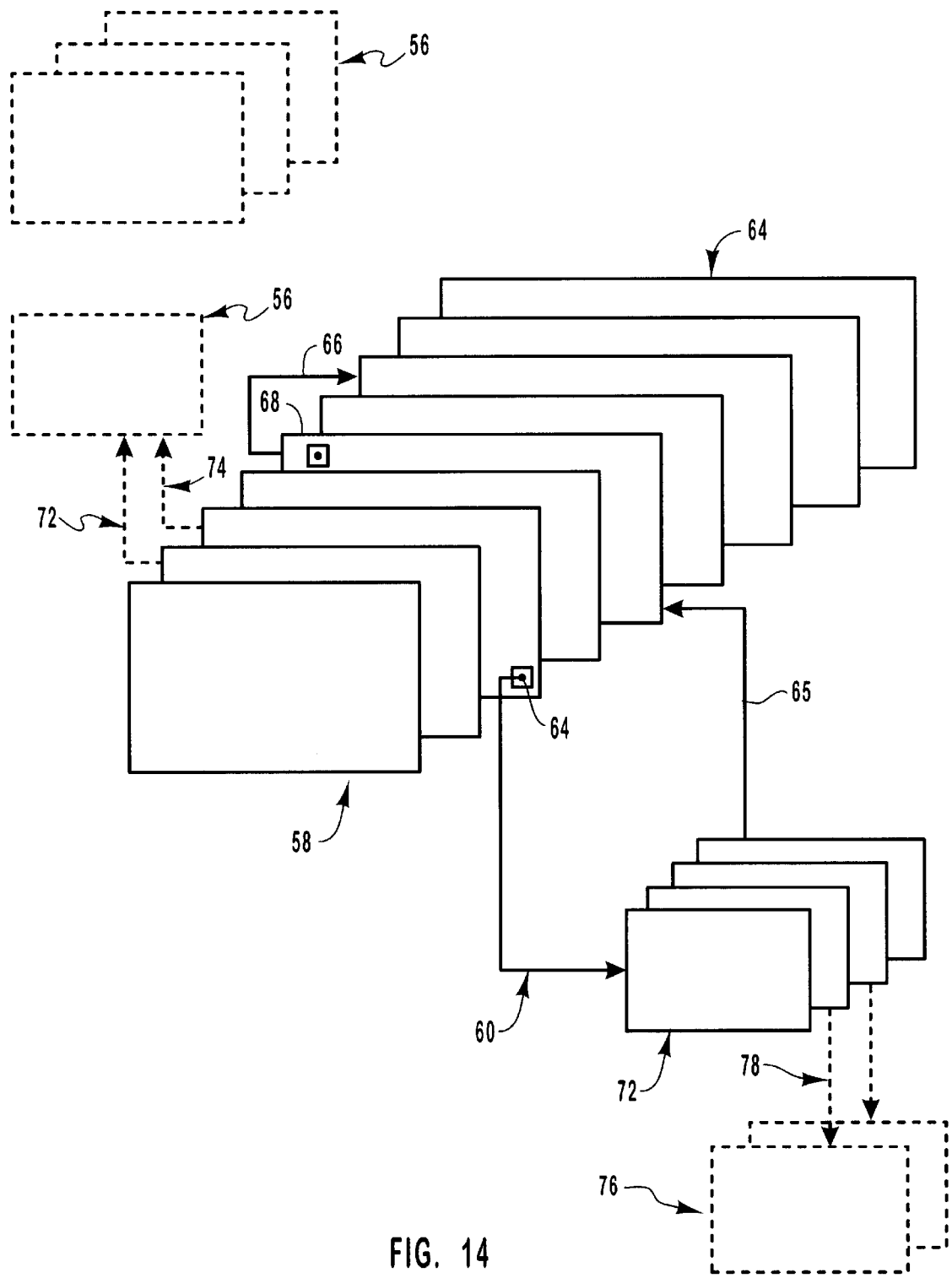
FIG. 14 is a structural diagram of the page layout and relationships utilized within the present invention.

Referring first to FIG. 14, a conceptual representation of a lesson is presented. As previously discussed, in one preferred embodiment a lesson is organized into pages. A page is a unit of information and can contain a plurality of resources. Possible resources include text, graphics, and sound. In one embodiment, a plurality of page types have been defined. Page types can include both visible pages and hidden pages. Visible pages are those pages which will be shown to the user when the lesson is activated via the presentation portion. Hidden pages are those pages which contain information which is not directly presented to the user in a form which is to be learned. The use of hidden pages will be explained in greater detail in the discussion describing how questions are generated presented later.

As depicted in FIG. 14, visible pages 54 are arranged so that they may be presented in a variety of ways. For example, FIG. 14 depicts a lesson which has a main pathway, shown generally as 58, where visible pages 54 are presented in a nominally sequential manner. All lessons, however, do not need to be organized in this manner. The authoring portion allows a developer or author to have ultimate control over any and all pathways which a user of the lesson may potentially take. For example, the lesson in FIG. 14 has a branch path, shown generally as 60, which may be reached by activating branch link 62 which has been tied to hot spot 64. In addition, the lesson in FIG. 14 also has a branch defined through the main pathway. This branch is taken by activating branch link 66 which is tied to hot spot 68. This branch illustrates that branches may be defined through any number of visible pages.

Returning again to branch path 60 which is reached through branch link 62, a feature of one preferred embodiment of the present invention is illustrated. As depicted in FIG. 4, branch path 60 is reached only when the user activates hot spot 64. Thus, if the user went through the lesson without activating hot spot 64, the information in branch path 60 would never be presented to the user. In contradistinction, the pages reached via link 66 when hot spot 68 is activated would have been reached any way if the user had continued through the lesson main path.

Also illustrated in FIG. 14 is return link 65. Return link 65 is used to determine what happens when the end of branch path 60 is reached. In the embodiment shown in FIG. 4, return link 65 takes the user to a point in the lesson different from where the user initiated the branch. As previously discussed in the section describing the presentation portion, such a return link may be utilized to return to a variety of locations. For example, return link 65 could be used to return the user to the initial page which initiated the branch. As another example, return link 65 may be used to move the user to a particular point in the lesson where questions are generated.

In addition to the single return link shown in FIG. 14, it is possible to generate a plurality of return links from branch path 60. For example, each page in branch path 60 may have a control button which allows the user to return to the main path in a predetermined location.

In order to enhance the learning process and to more fully determine what level of skill has been obtained, it is often desirable to test on principles which have not been directly presented to the user and which are only analogous to those which have been presented to the user. Although there are many potential ways to identify information which should be used in testing, but which should not be presented to the user, in one embodiment, a hidden page type is used. In FIG. 14, hidden pages 56 are represented by phantom lines.

Depending on the particular type of lesson and the information involved, certain analogous information may be relevant to the entire lesson. Other analogous information, however, may only be relevant to a single page or a group of pages. In order to identify the portion of the lesson which is relevant to the analogous data contained on hidden pages, one embodiment utilizes hidden page links. When information contained on a hidden page is relevant only to a particular page or a particular group of pages that information may be linked to those specific pages with hidden page links.

In FIG. 14, hidden page 70 is relevant to only two visible pages. Hidden page 70 is thus linked to those relevant visible pages by hidden page link 72 and hidden page link 74. Hidden data page 76, however, is only relevant to a single visible page. Thus, hidden page 76 is linked to the single relevant hidden page by hidden page link 78. In contradistinction, the group of hidden pages identified generally by 56 are relevant to the entire lesson. Thus, these pages are not linked to any specific page. It will be appreciated that other methodologies could be developed which identify the applicability of a page of hidden data. For example, hidden pages may have associated with them a scope parameter which identifies the range of pages in the lesson which are relevant to that page. In addition, default rules of association may be developed. The manner in which hidden pages are associated with visible pages has been given by way of illustration and should not be considered limiting of the scope of this invention.

Because of the wide variety of information that can be presented via the individual resources owned by a page and given the virtually infinite way in which pages may be organized into a lesson, it is imperative that the authoring portion include a robust set of tools which allows an author to quickly and easily assemble information into a completed lesson. A method and system for generating lesson material is described in commonly assigned U.S. Pat. No. 5,890,911, previously incorporated by reference for all purposes.

Since the purpose of the authoring portion is to allow an author to rapidly create a lesson by organizing relevant data into the proper format, means for quickly and easily handling various resources which are to be placed on a page is necessary. There are many ways of providing such a means. One way of providing such a means is to have a command line where the author enters commands which cause the authoring portion to place resources at various points on the page. In the alternative, selections or list boxes may also be used. In the presently preferred embodiment, however, a series of control buttons is used to provide "tools" which are utilized by an author to quickly and easily manipulate resources which are to be placed on a page. Potential resources which can be placed on a page include graphics, text, and sound. Individual tools tailored to manipulating each of these resources are thus desired in the preferred embodiment.

One primary advantage of the instant invention over the prior art is the ability to generate a lesson with testing and question capability without ever generating any questions. In other words, the instant invention takes the data available in the lesson and creates or generates questions from the data. Thus, an author need not generate questions when the lesson is created. In order to provide such capability, means for generating questions are included in one embodiment. The means for generating questions is illustrated in FIG. 13 by question generator 47.

In one embodiment, questions are generated at two fundamental times. The first event that will cause questions to be generated is when display question tool as shown in FIG. 9 is selected in the author portion. Another event that will cause questions to be generated is when the user selects a particular mode in the presentation portion. In one embodiment of the presentation portion, such modes include the study mode and the exam mode. In one embodiment, questions are generated by the authoring portion and by the presentation portion in exactly the same manner. In another embodiment, the questions are generated by the authoring portion and the presentation portion in exactly the same manner except that the presentation portion generates the questions in a random fashion whereas the authoring portion generates the questions in a non-random fashion.

When the system generates questions, each question has three parts. The first part is the question part. The question part is the actual question that is asked. The next part is the right answer part which represents the right answer to the question. Finally, there is the wrong, answer part. The wrong answer part comprises one or more wrong or distractor answers to the question.

In general, the question generation process pulls the question part, the right answer part, and the wrong answer part from the various resources contained on Concept Outline 810 for the selected lesson. When questions are generated, question template 912 or format of FIG. 9 is utilized. The particular type of format used is dependent upon the resources selected for the question part, the right answer part, and the wrong answer part of the question.

In one embodiment, the questions generated are multiple choice type questions. In this embodiment, one resource is selected as the question, and another resource is selected for the right answer part and the wrong answer part. The resources are then arranged on a page and presented to a user according to the type of resource utilized. Thus, if the question part comprised a graphic and the right answer part and wrong answer part comprised a sound resource then, the graphic and a plurality of sound resources would be arranged on the page and presented to the user. The user would then select from among the choices presented.

In one embodiment, a single type of resource is selected for the question part, and a single type of resource is selected for the right answer part and the wrong answer part. In another embodiment, a plurality of resources are selected for the question part and a single type of resource is selected for the right answer part and the wrong answer part. In still another embodiment, a single type of resource is selected for the question part and a plurality of resources are selected for the right answer part and the wrong answer part. In still another embodiment, a plurality of resources are selected for both the question part and for the right answer part and wrong answer part.

In one embodiment, the questions generated also include fill in the blank type questions. In one embodiment where fill in the blank type questions are utilized, the question part of the question comprises a single type of resource and the right answer part and wrong answer part comprise fill in the blank regions. In another embodiment utilizing fill in the blank questions, the question part comprises a plurality of resources and the right answer part and wrong answer part comprise fill in the blank regions.

When questions are presented to a user, the question part and right answer part and is wrong answer part can be laid out on the page in any logical manner which accommodates the resources which comprise the various parts of the question. Where a sound resource is presented, the question format can be configured to automatically create a visual representation of the sound which can be activated by the user to hear the sound. When a plurality of resources are used for a single part, the resources can be laid out so as to clearly delineate the question part from the right answer part and wrong answer part. When multiple choice questions are presented, the system can be configured so as to automatically generate control buttons or check boxes which may be activated by a user to select a given answer. When fill in the blank type questions are presented, the system can automatically generate regions for the question to be answered.

Figure 15:
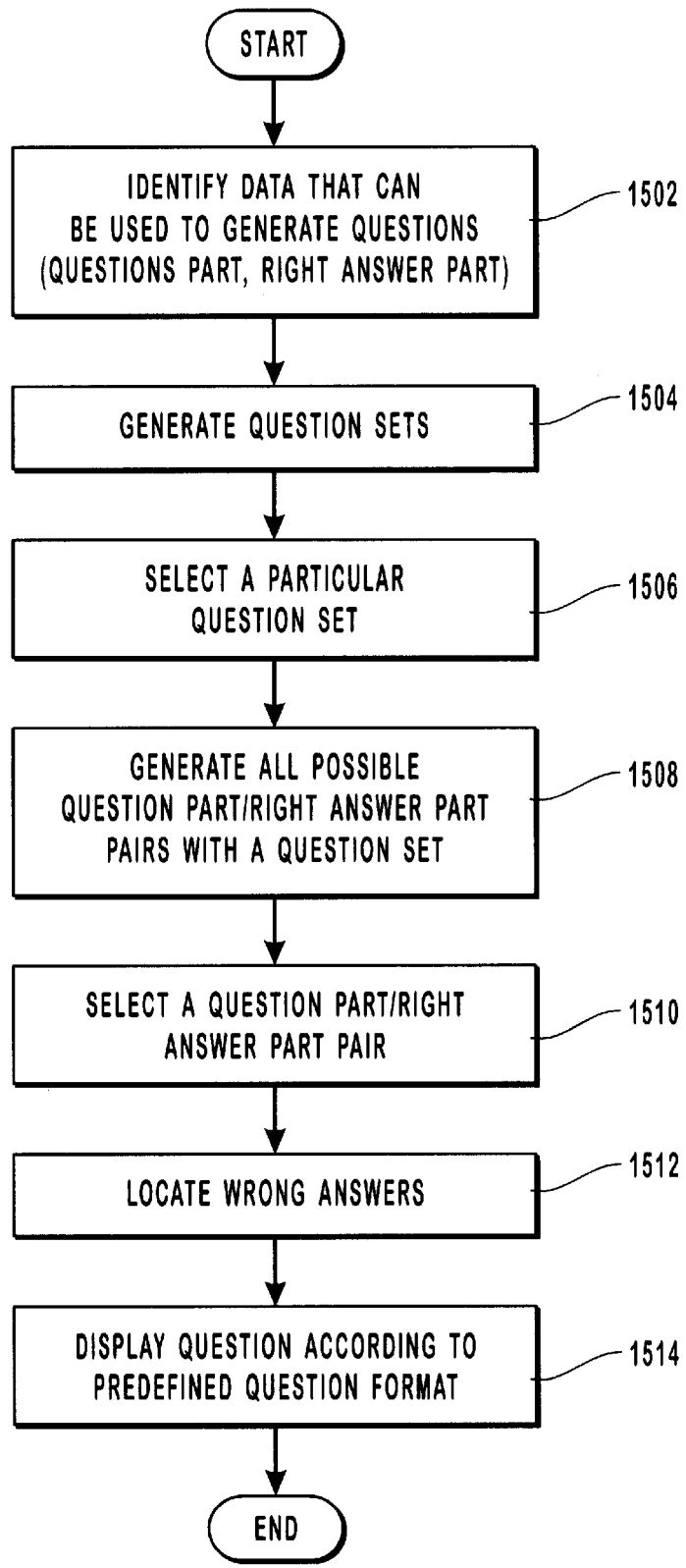
FIG. 15 is a basic flow chart showing how the question generation procedure is performed in either the authoring portion or the presentation portion of the present invention.

Referring now to the FIG. 15, a basic flow diagram of the question generation process is presented. The question generation process begins in step 1502 with the system identifying all data that can be used to generate the question. As indicated in FIG. 15, this includes identifying sources of data for the question part and the right answer part of the question. In performing this search for relevant data, the concept relations previously described are utilized. In one embodiment when the question generation routine is invoked via the authoring portion with a data page is displayed, the scope of the search is such that all possible questions based on the relationships established in the authoring portion of the lesson are generated. In another embodiment, when the question generation process is invoked in the authoring portion and the author is testing the questions that can be asked about the entire lesson, the scope of the search is such that all questions pertaining to the entire lesson can be generated. In a still further embodiment, when the question generation process is invoked by the user in the presentation portion via exam mode step 44, as illustrated in FIG. 7, the scope of the search is directed to data necessary to generate questions over the entire lesson, according to the relationships defined by the author.

Other embodiments may be developed which tailor the search scope in order to test on various aspects of the lesson. For example, the search scope may be tailored to finding information necessary to generate questions over a particular topic included in a lesson. As another example, the search may be tailored to finding information necessary to generate questions over all material which has been presented to the user but exclude material which has not been presented to the user.

Returning now to FIG. 15, after the data has been identified which can be used to generate questions over the appropriate scope, the next step 1504 is to generate question sets. Question sets are used to identify where the question part and right answer part are to be found.

Once the question sets have been identified, a particular question set is selected in step 1506. In one embodiment, the method used to select a particular question set depends on where the question generation process was invoked. For example, if the question generation process was invoked from the authoring portion, it may be desirable to select question sets in a sequential, non-repetitious fashion. This would allow an author to see all potential questions which could be generated within the given scope. If, however, the question generation process is invoked from the user portion it may be desirable to randomly select from among the available question sets. This would allow questions to be generated in a random fashion which provides better feedback during the learning process.

Returning now to FIG. 15, once a particular question set is selected, all possible question part/right answer part pairs associated with that question set are generated in step 1508. In order to generate all possible question part/right answer part pairs, means to identify potential question parts and right answer parts must be included.

As an example, consider a embodiment where a topic may contain a graphic resource, a sound resource, and four separate text resources. From these resources, it is possible to generate questions from each of the individual resources and from combinations of the resources. In one embodiment, the possible question parts for these resources are graphic, sound, text 1, text 2, text 3, text 4, graphic-sound, graphic-text 1, graphic-text 2, graphic-text 3, graphic-text 4, sound-text 1, sound-text 2, sound-text 3, and sound-text 4. The same combination of resources can also be utilized for possible answer parts. In addition, it is possible to identify a fill-ill-the-blank answer part. In one embodiment, four separate fill-in-the-blank answer parts are identified.

Once all possible questions part/light answer part pairs are generated, one question part/right answer part pair is selected in step 1510 for the individual question. As previously indicated, how the question part/right answer part pair is selected may be dependent upon where the question generation process is invoked. For example, if an author invokes the question generation process from the authoring portion, the question part/right answer part pairs may be selected in a sequential, non-random fashion so the author may view all potential questions which may be generated from a selected question set. Alternatively, if the question generation process is invoked by the user in the presentation part, the question part/right answer part pairs may be selected in a random fashion so as to enhance the effectiveness of either a study mode or an exam mode.

As previously indicated, not only can the particular question set be selected at random from among the question sets available, but also the particular question part/right answer part pair can be selected at random. This random methodology is particularly useful in the presentation part. In one preferred embodiment it is desired to randomly generate questions when the question generation process is invoked from the presentation portion in such a manner that questions are presented without repetition. Many procedures are available in order to accomplish selection of both question sets and question part/right answer part pairs in such a manner that the questions presented to the user are generated without repetition.

Once a question part/right answer part pair has been selected, the next step 1512 is to locate wrong answers which would be appropriate for inclusion in the question. The wrong answers are selected based on the context relationship of the tested topic in accordance with the teachings of the present invention.

Once the right question part/right answer part has been identified along with a sufficient number of wrong answers for the question format which is to be presented, the question is displayed in step 1514 according to the pre-defined question format.

If the routine is invoked from the authoring portion, a mechanism allows the author to quickly and easily scroll through all possible question part/right answer part pairs drawn from all possible question sets. In one embodiment, means by which the question part and right answer part pairs may be viewed is provided. In the present embodiment, this means comprises menus, dialogue boxes, list boxes, icons, control buttons, and the like normally associated with the GUI environments illustrated for this system.

In one embodiment, the authoring portion allows the developer or author to have control over the number and/or type of questions asked in the user portion. A simple analogy is that the authoring portion specifies the rules which will be used to generate questions in the presentation portion. Thus, means by which an author may control the scope of questions asked is provided. In one embodiment, this means allows the author to preview all possible questions which may be asked and mark those questions which should be excluded from the questions which may be asked in the presentation portion. In another preferred embodiment, the means comprises the ability to eliminate questions involving a particular resource. In still another embodiment, the means comprises the ability to eliminate fields which may be used to generate questions in the presentation portion. It is anticipated that a wide variety of tools to allow the author to tailor the questions to be generated in the presentation portion will be provided.

In order to enhance the evaluation and feedback from the invention, other features may be included. For example, any of the testing methodologies employed by those in the testing art to evaluate a user's comprehension and grasp of the material can be included. Thus, the instant invention can be designed so as to vary the number and difficulty of questions in order to ascertain mastery of a particular subject. In one embodiment, questions have associated with them specific parameters which allow evaluation of the question. In one embodiment, these parameters include a measure of difficulty, a measure of the time a user takes to answer the question, and a measure of a passing or failing score.

Questions generated by the instant invention may also have an associated feedback parameter. Such a feedback parameter may include actions taken upon completion of the question. For example, feedback can come in the form of correct or incorrect response indication. As another example, feedback can be descriptive. Descriptive feedback includes situations where additional information is presented to the user. Thus, once a question is answered, the user can be informed of his or her score in relation to a predefined threshold, or in relation to other scores. Other additional information may also be presented with descriptive feedback.

Feedback may also be prescriptive. Prescriptive feedback helps the user reinforce his or her knowledge. Thus, upon answering a question, the user may be presented with an option to return to the particular part of the lesson where the information from which the question was generated is presented. In addition, the user may be presented with information particularly tailored by the author to provide a review over the subject material covered by the question. In some cases, it might be helpful to compel the user to learn or review more information based on an evaluation of the user's answers. Furthermore, when the time taken to answer a question is considered, tests can be crafted to measure the rapidity with which a user can work through a given test. Thus, overall time on a test or set of questions from a test may be measured, evaluated, and used to adapt the test to a particular user.

Questions may also be divided into groups which illustrate their relationship to the overall subject matter contained in the lesson. For example, questions which pertain to the same idea or same concept may be grouped into a question set. Feedback may then be given either on individual questions or on the entire question set or on both. Question sets can contain measures of difficulty, measures of time, measures of a passing or failing score, descriptive feedback, and prescriptive feedback.

As another example, question sets that are all related by a major concept or topic, may be grouped into a question set on collection. The material presented in a question set collection can be taken from the material presented to the user or it can be new material which has not been presented to the user. Use of information not previously presented to the user is particularly useful when testing mastery of a concept. A question set collection can also contain a measure of the difficulty of the collection, a measure of time needed to complete the question set collection, a measure of a passing or failing score, descriptive feedback, and prescriptive feedback.

Questions that relate to a series of major topics can be indicated by grouping question set collections into a question series. A question series is designed to test over a plurality of major topics. A question series may also contain a measure of difficulty, a measure of time needed to complete the series, a measure of a passing or failing score, descriptive feedback, and prescriptive feedback.

Feedback, whether descriptive or prescriptive, can be given at any point along the way. For example, feedback may be given after each question, or feedback may be held until the completion of a group of questions. For example, feedback associated with a question set may be held until the question set is complete. Feedback associated with a question set collection or a question series may also be held until the question set collection or question series is complete.

Finally, questions may be asked in an exam mode. In one embodiment, the exam mode asks each question once without feedback. In another embodiment, each question is asked and feedback provided. The exam mode can contain such items as measures of difficulty for the questions asked, a measure of the time needed to complete the exam, measure of passing or failing score, descriptive feedback and prescriptive feedback.

In addition, questions asked either in an exam mode or due to another trigger such as a study button, may be used to modify the subsequent questions asked. In other words, evaluation of the questions answered thus far may be used to modify subsequent questions asked. For example, if the user answers a given number of questions of difficulty level one without mistakes, the system may begin asking questions of difficulty level two. As another example, if the system determines through an evaluation mechanism that the user either has clearly mastered or clearly not mastered the material, an action can be performed. Such an action might be to terminate asking questions or to begin presenting material. If the user has not mastered the material, the presented material may be review and learning material. If the user has mastered the material, it may be new material a user has not yet seen.

In an alternative embodiment, the system may be implemented as a computer program product for use with a computer system. Such implementation may include a series of computer instructions fixed either on a tangible medium, such as computer readable media (disk e.g., diskette, CD-ROM disk or other nonvolatile storage utilized in the computer system on which the present invention is embodied) or transmittable to a computer system via a modem or other interface device, such as a network or Internet connection. The transmission of computer readable media may also provide for the invention to be embodied in propagated signals that are readable and executable by the targeted computer system. The series of computer instructions embody all or part of the functionality previously described herein with respect to the system. Those skilled in the art should appreciate that such computer instructions can be written in a number of programming languages for use with many computer architectures or operating systems. Furthermore, such instructions may be stored in any memory device, such as semi-conductor, magnetic, optical or other memory devices, and may be transmitted using any communications technology, such as optical, infrared, microwave, or other transmission technologies that are capable of transmitting a propagated signal wave. It is expected that such a computer program product may be distributed as a removable media with accompanying printed or electronic documentation (e.g., shrink wrapped software) preloaded with a computer system (e.g., on system ROM or fixed disk) or distributed from a server or electronic bulletin board over the network in a form of a propagated signal (e.g., the Internet or Worldwide Web).

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of computerized authoring, learning and evaluation for arranging data relevant to a topic into a format which allows for presentation of that data and concomitant user initiated testing of portions of that data through questions that are randomly generated, the method comprising:
   a) obtaining a pool of data objects relevant to a topic;
   b) relating at least one data object with at least another data object; and
   c) generating questions on the related objects presented to the user.

2. A method of computerized authoring, learning and evaluation as defined in claim 1, further comprising the step of presenting a preselected number of the generated questions to the user.

3. A method of computerized authoring, learning, and evaluation as defined in claim 2, further comprising the step of presenting an additional preselected number of questions if the user did not perform at a predetermined level.

4. A method of computerized authoring, learning, and evaluation as defined in clam 1, further comprising arranging at least a portion of the data in page format wherein the data can be presented hyper sequentially to the user.

5. A method of computerized authoring, learning, and evaluation as defined in claim 1, further comprising the step of indexing the related data objects.

6. A method of computerized authoring, learning, and evaluation for arranging data relevant to a topic into a format which allows for presentation of that data and concomitant user initiated testing of portions of that data through questions that are randomly generated, the method comprising:
   a) obtaining a pool of data objects relevant to a topic;
   b) relating at least one data object with at least another data object;
   c) generating questions on the related objects presented to the user;
   d) presenting a preselected number of the generated questions to the user;
   e) presenting an additional preselected number of questions if the user did not perform at a predetermined level; and
   f) returning the user to at least one presented page from which the improperly answered questions were generated.

7. A computerized authoring, learning, and evaluation system for arranging data relevant to a topic in a format which allows for presentation of that data and concomitant user-initiated testing of portions of that data through questions that are generated, the system comprising:
   means for obtaining a pool of data objects pertaining to a topic;
   means for selecting some of the data objects;
   means for conceptualizing the selected data objects within a defined context; and
   means for generating questions on the conceptualized data objects for review.

8. A computerized authoring, learning, and evaluation system as recited in claim 7, wherein at least a portion of the data is arranged in page format and can be presented sequentially to the user.

9. A computerized authoring, learning, and evaluation system as recited in claim 7, wherein at least a portion of the data is arranged in page format and can be presented hyper sequentially to the user.

10. A method of computerized authoring, learning, and evaluation for arranging data pertaining to a selected topic into a format that allows for selective access and presentation of that data and student testing of portions of that data through questions that are generated, the method comprising:

a) obtaining a pool of data objects pertaining to a topic;
b) selecting some of the data objects;
c) conceptualizing the selected data objects within a defined context;
d) indexing the selected data objects based on the defined context; and
e) generating questions on the conceptualized data objects for review.

11. A method for allowing a user of a computer to selectively access additional information as defined in claim 10, wherein the steps of conceptualizing further comprise the steps of:

organizing the data objects into pages of data; and
branching to additional pages of data.

12. A method of organizing data as recited in claim 11, where a selected page is a page not presented to a user of a presentation portion of a computerized authoring, learning, and evaluation system.

13. A method of organizing data as recited in claim 11, wherein a plurality of such pages are created.

14. A method of organizing data as recited in claim 11, further comprising the step of creating a page identifier that is associated with each page.

15. A method of organizing data as recited in claim 14, wherein the page identifier comprises:

a) a page name;
b) a page topic;
c) one or more page links; and
d) a page type.

16. A method of computerized authoring, learning, and evaluation for arranging data pertaining to a selected topic into a format that allows for selective access and presentation of that data and student testing of portions of that data through questions that are generated, the method comprising:

a) obtaining a pool of data objects pertaining to a topic;
b) selecting some of the data objects;
c) conceptualizing the selected data objects within a defined context by organizing the data objects into pages of data, where a selected page is a page to be presented to a user of a presentation portion of a computerized authoring, learning, and evaluation system, and branching to additional pages of data;
d) indexing the selected data objects based on the defined context; and
e) generating questions on the conceptualized data objects for review.

17. A method of computerized authoring, learning, and evaluation for arranging data pertaining to a selected topic into a format that allows for selective access and presentation of that data and student testing of portions of that data through questions that are generated, the method comprising:

a) obtaining a pool of data objects pertaining to a topic;
b) selecting some of the data objects;
c) conceptualizing the selected data objects within a defined context by organizing the data objects into pages of data and branching to additional pages of data, wherein the plurality of pages are organized for presentation to the user of a presentation portion of a computerized authoring, learning, and evaluation system;
d) indexing the selected data objects based on the defined context; and
e) generating questions on the conceptualized data objects for review.

18. A method of organizing data as recited in claim 17, wherein the organized pages are organized so that a portion of the pages can be viewed sequentially.

19. A method organizing data as recited in claim 17, wherein the organized pages are organized so that a portion of the pages can be viewed hyper sequentially.

20. An authoring portion of computerize authoring, learning, and evaluation system to aid an author in organizing data for presentation to a user of a presentation portion of a computerized authoring, learning, and evaluation system, the authoring portion comprising:

an input device to receive input from an author;
a display system to display information to the author;
a processing unit interfacing with the input device and the display system;
a memory store coupled to the processing unit, the memory store containing a sequence of coded instructions that are executed by the processing unit, the sequence of coded instructions comprising:
means to maintain a database and to obtain data objects stored in the database and pertaining to a topic;
means to select some of the data objects;
means to conceptualize the selected data objects within a defined context; and
means to generate questions on the conceptualized data objects for review.

21. An authoring portion as recited in claim 20, wherein the means to maintain the database further comprises a plurality of resource tools that allow manipulation and placement of resources.

22. An authoring portion as recited in claim 21, wherein the means to select some of the data objects further comprises means to input the resource.

23. An authoring portion as recited in claim 20, wherein the coded instructions further comprise means to preview the generated questions.

24. An authoring portion as recited in claim 23, wherein the means to preview questions allows the author to preview questions generated on a particular concept.

25. An authoring portion as recited in claim 23, wherein the questions are generated over a plurality of pages and the means to preview questions allows the author to preview questions generated over the plurality of pages.

26. An authoring portion as recited in claim 20, wherein the coded instructions further comprise means to control the number of questions generated by a user of a computerized learning, response and evaluation system.

27. An authoring portion as recited in claim 20, wherein the coded instructions further comprise means to create fields on a page.

28. An authoring portion as recited in claim 20, wherein the coded instructions further comprise means to define a plurality of page types.

29. An authoring portion as recited in claim 28, wherein the coded instructions further comprise means to define branches between pages.

30. An authorizing portion as recited in claim 28, wherein the coded instructions further comprise means to define hot spots on a page.

31. A computer program product for arranging data relevant to a topic into a format which allows for presentation of that data and concomitant user initiated testing of portions of that data through questions that are randomly generated, said computer program product comprising a computer usable medium having computer readable program code thereon including:

program code that modifies a computer system to obtain a pool of data objects relevant to a topic;

program code that modifies a computer system to relate at least one data object with at least another data object; and program code that modifies a computer system to generate questions on the related objects presented to the user to test the user's understanding of the data.

32. A computer program product as defined in claim 31, further comprising program code that modifies a computer system to present a preselected number of the generated questions to the user.

33. A computer program product as defined in claim 31, further comprising program code that modifies a computer system to present an additional preselected number of questions if the user did not perform at a predetermined level.

34. A computer program product as defined in claim 31, further comprising program code that modifies a computer system to return the user a presented page from which the improperly answered questions were generated.

35. A computer program product as defined in claim 31, wherein at least a portion of the data is arranged in page format that can be presented hyper sequentially to the user.

36. A computer program product as defined in claim 31, further comprising program code that modifies a computer system to present a preselected number of the generated questions to the user.

37. A computer program product as defined in claim 31, further comprising program code that modifies a computer system to present an additional preselected number of questions if the user did not perform at a predetermined level on the generated question.

38. A computer program product as defined in claim 31, further comprising program code that modifies a computer system to index the related data objects.

* * * * *